(12) United States Patent
Nakashio et al.

(10) Patent No.: US 12,113,939 B2
(45) Date of Patent: Oct. 8, 2024

(54) INFORMATION PROCESSING APPARATUS THAT DETECTS MEASUREMENT SHEETS FOR VERIFYING COLOR ACCURACY, CONTROL METHOD THEREOF, AND STORAGE MEDIUM

(71) Applicant: CANON KABUSHIKI KAISHA, Tokyo (JP)

(72) Inventors: Hidekazu Nakashio, Saitama (JP); Yukihiro Shindo, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/297,902

(22) Filed: Apr. 10, 2023

(65) Prior Publication Data

US 2023/0353686 A1    Nov. 2, 2023

(30) Foreign Application Priority Data

Apr. 27, 2022    (JP) ................. 2022-073678

(51) Int. Cl.
  *H04N 1/00*    (2006.01)
(52) U.S. Cl.
  CPC ..... *H04N 1/00034* (2013.01); *H04N 1/00023* (2013.01); *H04N 1/00074* (2013.01)
(58) Field of Classification Search
  USPC ....................................................... 358/504
  See application file for complete search history.

(56) References Cited

U.S. PATENT DOCUMENTS

| | | | |
|---|---|---|---|
| 11,150,136 B2 | 10/2021 | Inada | |
| 2006/0210297 A1* | 9/2006 | Tanaka | G03G 15/502 399/82 |
| 2008/0024827 A1* | 1/2008 | Kokubo | B65H 7/02 358/3.26 |
| 2012/0019850 A1* | 1/2012 | Tezuka | H04N 1/6033 358/1.9 |
| 2017/0048423 A1* | 2/2017 | Itagaki | H04N 1/00058 |
| 2018/0027132 A1* | 1/2018 | Yamasaki | H04N 1/00408 358/504 |

FOREIGN PATENT DOCUMENTS

JP    2020030754 A    2/2020

* cited by examiner

*Primary Examiner* — Jacky X Zheng
(74) *Attorney, Agent, or Firm* — ROSSI, KIMMS & McDOWELL LLP

(57) ABSTRACT

The present invention is directed to an information processing apparatus, the method comprising: detecting whether a sheet is set in a measurement device in accordance with a detection condition; in a case where a sheet is detected as being set, measuring a patch formed on the sheet, using the measurement device; and setting a first detection condition for detecting that a sheet is set in the measurement device and a second detection condition for detecting that a sheet is not set in the measurement device to mutually-different conditions.

12 Claims, 16 Drawing Sheets

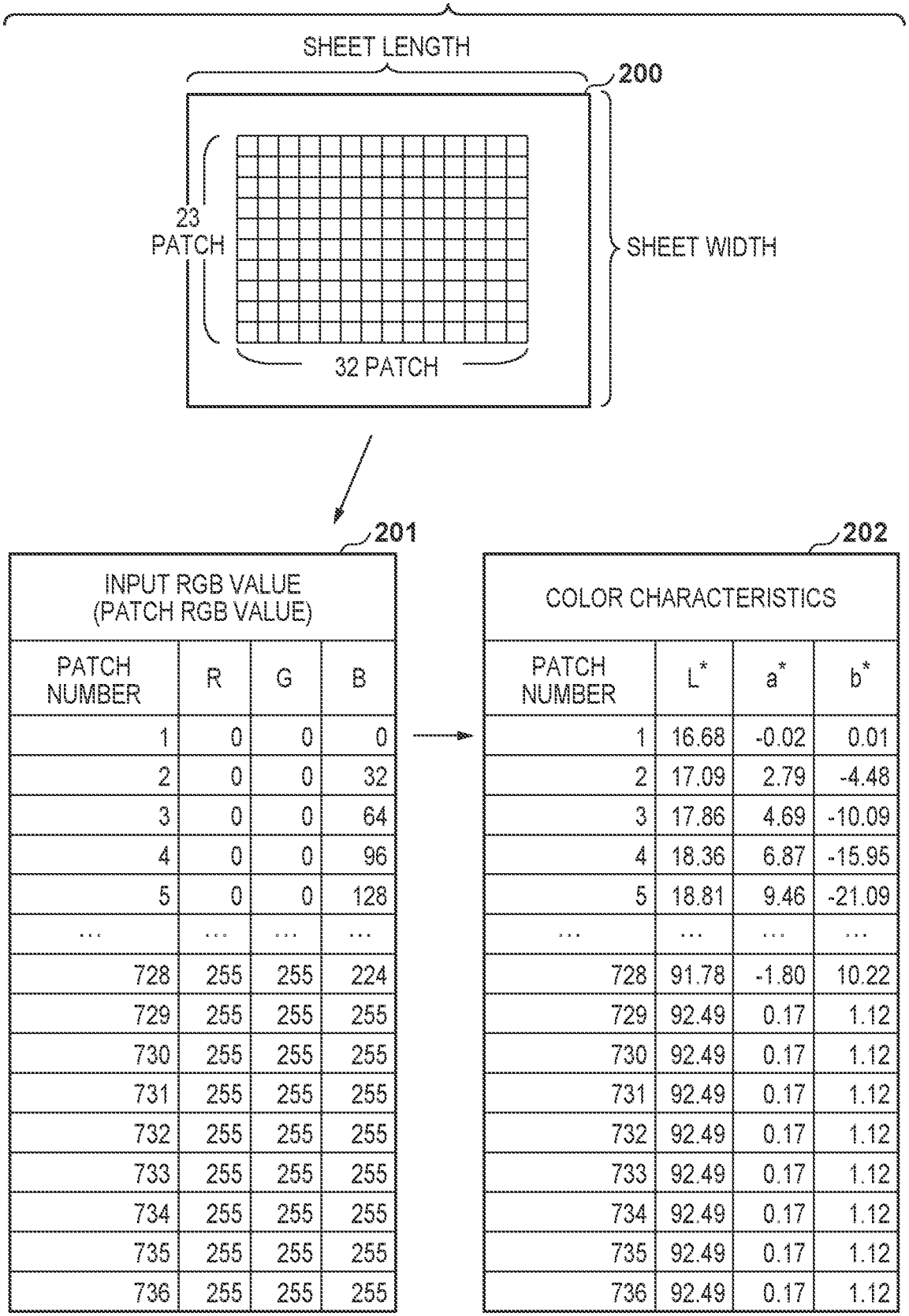

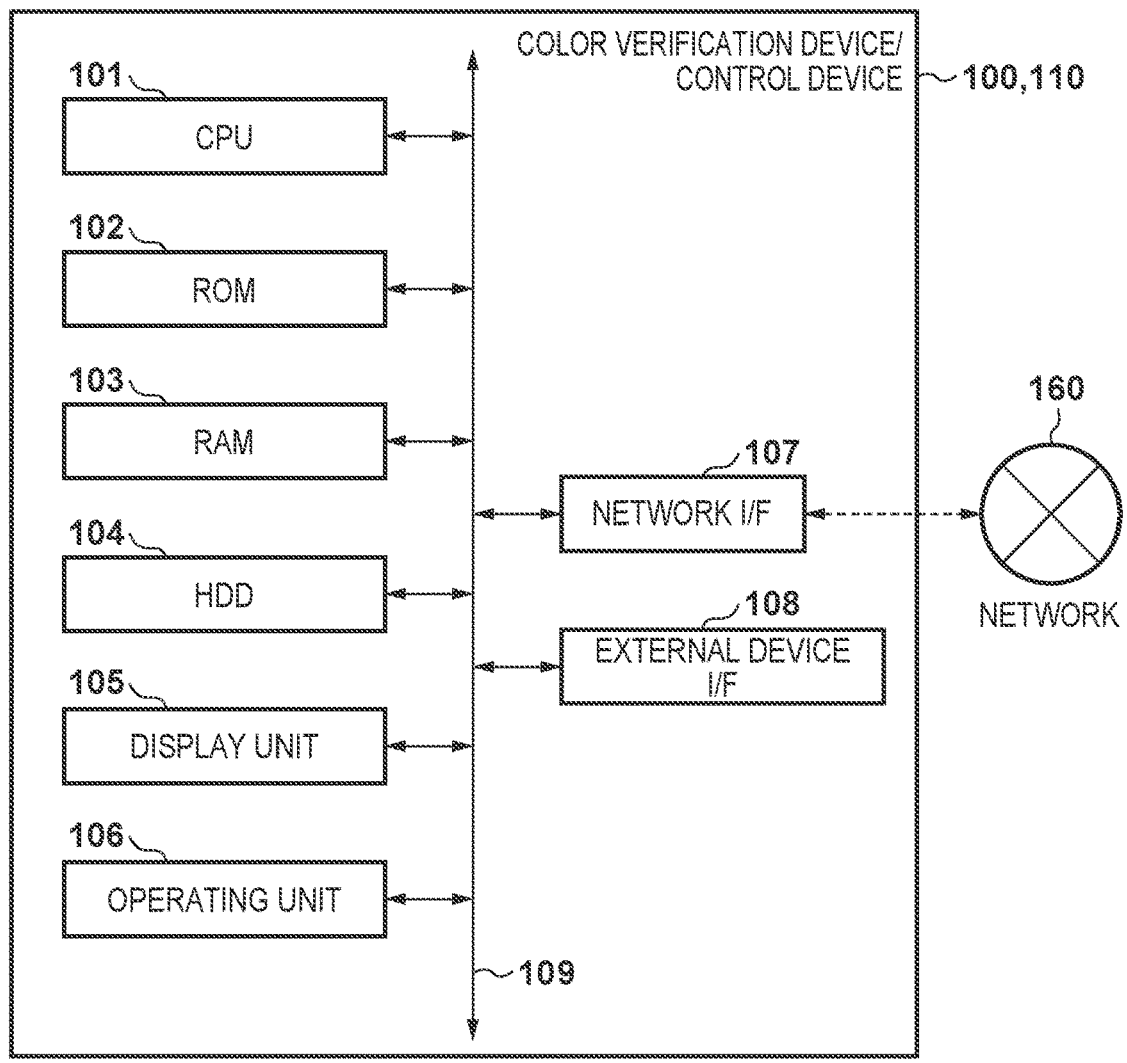
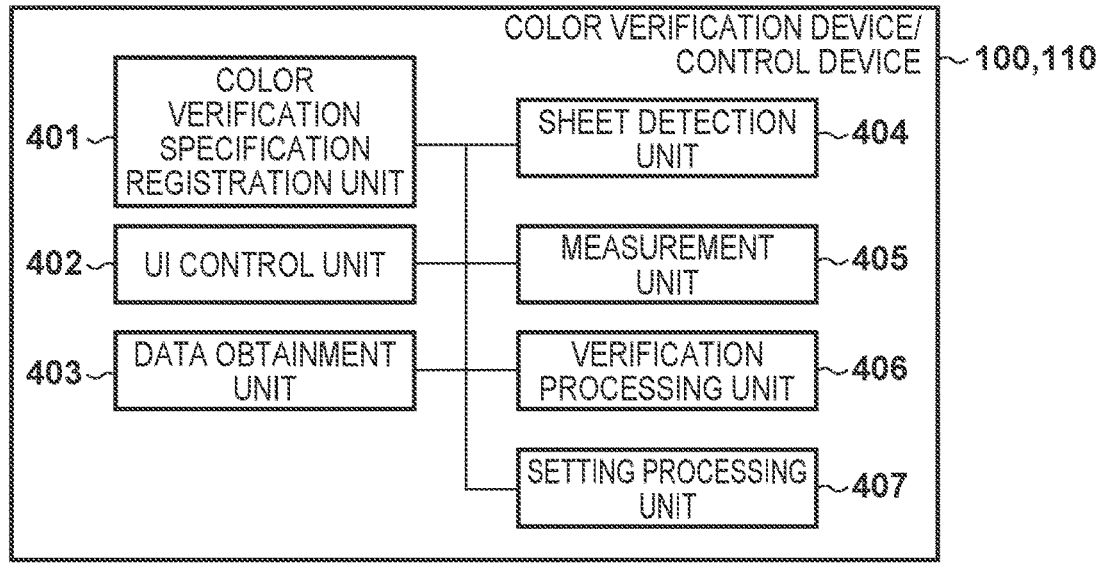

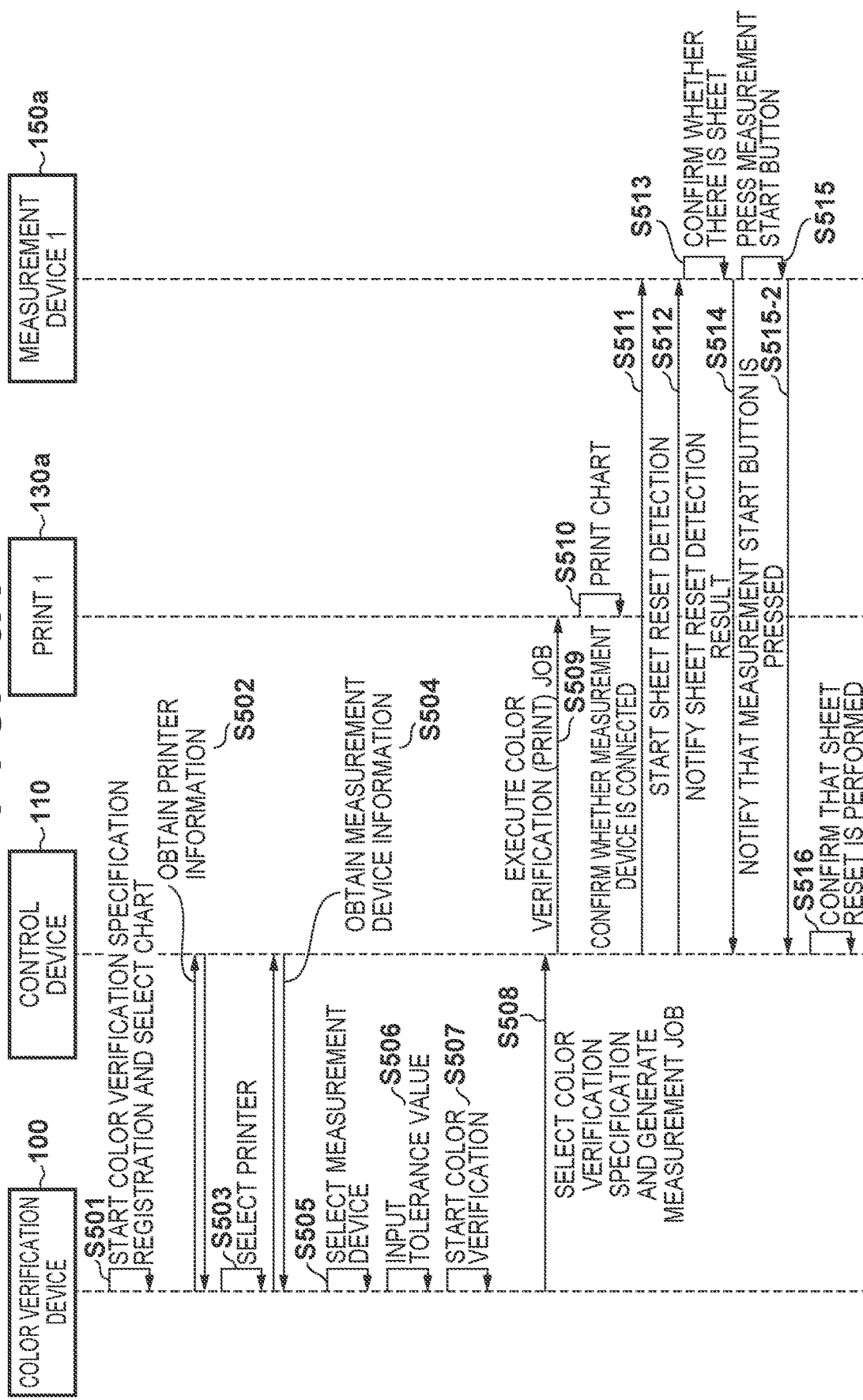

FIG. 6G

| | INPUT TOLERANCE VALUE | |
|---|---|---|
| 622 — | AVERAGE VALUE | 4.0 |
| 623 — | MAXIMUM VALUE | 10.0 |
| 624 — | PRIMARY COLOR | 5.0 |
| | YES | NO |

TOLERANCE VALUE OF COLOR DIFFERENCE

FIG. 6H

SELECT COLOR VERIFICATION SPECIFICATION

- 625 — COLOR VERIFICATION SPECIFICATION 1
- 626 — COLOR VERIFICATION SPECIFICATION 2

YES    NO

FIG. 6I

REPORT RESULT

| | | | |
|---|---|---|---|
| 825 — | AVERAGE VALUE | 2.91 | OK |
| 826 — | MAXIMUM VALUE | 9.00 | OK |
| 827 — | PRIMARY COLOR (C) | 1.02 | OK |
| 828 — | PRIMARY COLOR (M) | 1.3 | OK |
| 829 — | PRIMARY COLOR (Y) | 2.4 | OK |
| 830 — | PRIMARY COLOR (K) | 3.4 | OK |

YES    NO

FIG. 6J

MEASURE CHART

PLEASE SET PRINTED CHART
TO MEASUREMENT DEVICE 1

YES    NO

FIG. 6K

MEASURE CHART

PLEASE REMOVE DISCHARGED CHART
FROM MEASUREMENT DEVICE 1

YES    NO

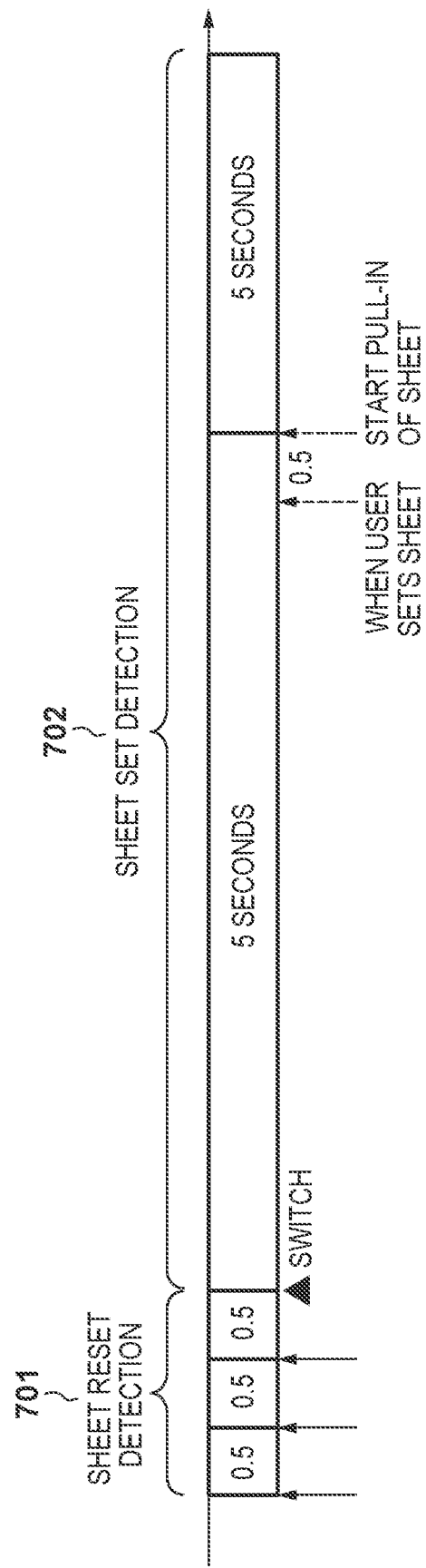

INFORMATION PROCESSING APPARATUS THAT DETECTS MEASUREMENT SHEETS FOR VERIFYING COLOR ACCURACY, CONTROL METHOD THEREOF, AND STORAGE MEDIUM

BACKGROUND OF THE INVENTION

Field of the Invention

The present invention relates to an information processing apparatus that verifies color accuracy of a printer, a control method thereof, and a storage medium.

Description of the Related Art

In general, color management is performed periodically in commercial color printers to ensure constant color reproducibility. Color management is performed by comparing a color serving as a target (a target color) determined by a printing authentication standard, such as JapanColor, with a color actually printed by the printer (a print color), and checking that the color accuracy meets an acceptance standard. If the color accuracy does not meet the acceptance standard, the printing profile must be recreated, correction processing must be performed using a color correction function of the printer, or the like to improve the color accuracy, but these are laborious and time-consuming tasks and therefore need to be performed efficiently. Japanese Patent Laid-Open No. 2020-30754 proposes a technique that verifies the color accuracy of a printer (color verification) at a plurality of points in time during printing, determines a cycle at which to perform a correction task based on a result of the verification, and displays a history of the verification results.

SUMMARY OF THE INVENTION

However, this conventional technique has the following issue. For example, when obtaining a print color in color verification, a chart having color patches corresponding to target colors is printed using the printer, and chromaticity values for each color patch are measured using a measurement device. When measuring using a "sheet-through" manual measurement device, it is necessary for the user to set sheets in the measurement device one at a time, and there is a problem in that if the sheet is fed too soon after being set, wrinkles in the sheet, folded corners, and the like will occur, resulting in measurement defects. On the other hand, there is a problem in that if the sheet is fed too late after being set, the measurement will be delayed, which is inconvenient for the user. The past technique described above does not take these problems into account, and there is thus room for improvement in terms of measurement defects caused by wrinkles in the sheets, folded corners, and the like, as well as in terms of the convenience for the user.

The present invention enables the realization of a mechanism that both prevents measurement defects caused by wrinkles, folded corners, and the like when manually setting a sheet in a measurement device, and improves the convenience for a user.

One aspect of the present invention provides an information processing apparatus comprising: a detection unit that detects whether a sheet is set in a measurement device in accordance with a detection condition; a measurement unit that, in a case where a sheet is detected as being set, measures a patch formed on the sheet, using the measurement device; and a control unit that sets a first detection condition for detecting that a sheet is set in the measurement device and a second detection condition for detecting that a sheet is not set in the measurement device to mutually-different conditions.

Another aspect of the present invention provides a control method for an information processing apparatus, the method comprising: detecting whether a sheet is set in a measurement device in accordance with a detection condition; in a case where a sheet is detected as being set, measuring a patch formed on the sheet, using the measurement device; and setting a first detection condition for detecting that a sheet is set in the measurement device and a second detection condition for detecting that a sheet is not set in the measurement device to mutually-different conditions.

Still another aspect of the present invention provides a non-transitory computer-readable storage medium storing a computer program for causing a computer to execute each step of a control method for an information processing apparatus, the method comprising: detecting whether a sheet is set in a measurement device in accordance with a detection condition; in a case where a sheet is detected as being set, measuring a patch formed on the sheet, using the measurement device; and setting a first detection condition for detecting that a sheet is set in the measurement device and a second detection condition for detecting that a sheet is not set in the measurement device to mutually-different conditions.

Further features of the present invention will be apparent from the following description of exemplary embodiments with reference to the attached drawings.

BRIEF DESCRIPTION OF THE DRAWINGS

FIG. 2 is a diagram illustrating an example of patch signal values and color characteristics of a color verification chart according to one embodiment.

FIG. 3 is a block diagram illustrating the hardware configuration of a color verification device and a control device according to one embodiment.

FIG. 4 is a block diagram illustrating the primary functional configuration of a color verification device according to one embodiment.

FIG. 5A is a sequence chart illustrating the flow of processing in the color verification system according to one embodiment.

FIGS. 6G to 6I are diagrams illustrating an example of the display unit 105 according to one embodiment.

FIGS. 6J and 6K are diagrams illustrating an example of the display unit 105 according to one embodiment.

FIG. 7 is a diagram illustrating an example of a sheet detection execution instruction interval (detection condition) in a sheet detection unit 404 according to one embodiment.

FIG. 9 is a diagram illustrating an example of a sheet detection execution instruction interval (detection condition) in the sheet detection unit 404 according to one embodiment.

DESCRIPTION OF THE EMBODIMENTS

Figure 1:
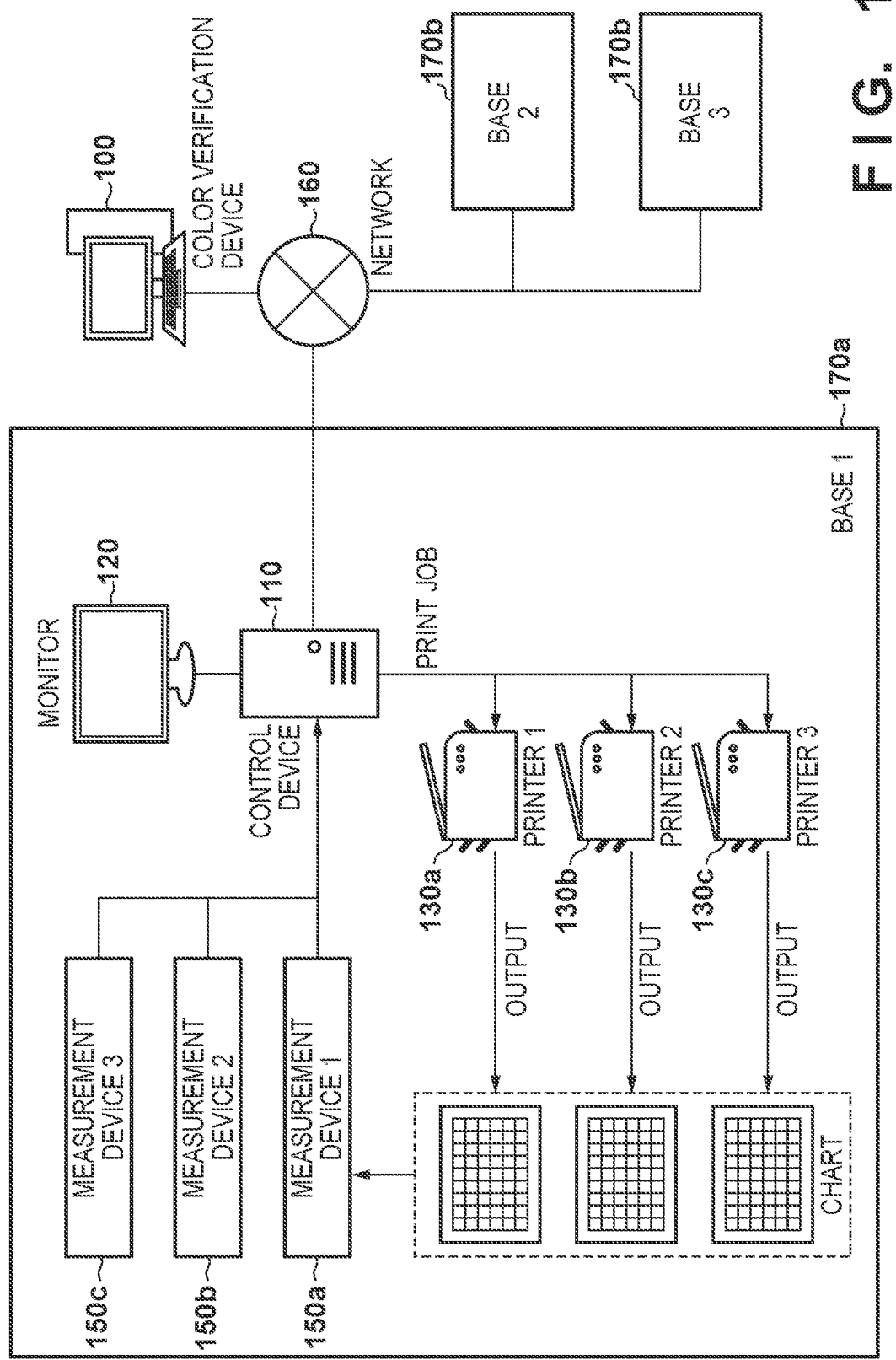
FIG. 1 is a diagram illustrating the overall configuration of a color verification system according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

System Configuration

First, an example of the configuration of a color verification system according to the present embodiment will be described with reference to FIG. 1. When verifying color accuracy in this color verification system, a predetermined chart is first printed and output from a printer to be verified. Next, color patches on the printed-out chart are measured by a colorimeter, and the resulting colorimetric data is transmitted to a color verification device 100. The color verification device 100 then checks for a deviation between the print colors and target colors (color accuracy). Note that the color patches arranged in the chart are also referred to as "color chips", "color swatches", or the like, and will simply be referred to as "patches" in the present specification.

As illustrated in FIG. 1, in this color verification system, the color verification device 100 is connected to bases 1 to 3 over a network 160. The base 1 is configured including a control device 110, a monitor 120, printers 1 to 3 (130a to 130c), and measurement devices 1 to 3 (150a to 150c). The bases 2 and 3 are also configured including a control device, a monitor, printers, and measurement devices, respectively. A relationship between the base 1 and the color verification device 100 will be described as an example hereinafter.

The color verification device 100 verifies whether the color accuracy meets an acceptance standard by comparing a color serving as a target defined in advance (the target color) with a color actually printed by the printer (the print color). The color verification device 100 is connected to the control device 110 over the network 160 such that the two devices can communicate with each other.

The control device 110 is communicably connected to the printers 130a to 130c in the base 1 over a communication network such as an intranet, and issues printing instructions to each printer, centrally manages the color accuracy of each printer, and the like. With a printing instruction, for example, it is also possible to receive a print job from a client terminal (not shown), divide the print job into predetermined units (e.g., units of copies or pages), and distribute the print job among a plurality of printers before issuing printing instructions. The print job includes a PDL data part in which rendering commands for objects of each of attributes, such as text, graphics, and photographs, are written on a page-by-page basis, and print settings information that specifies printing conditions such as sheet size and type, double-sided/single-sided printing, and so on. Distributing a single print job among a plurality of printers and issuing printing instructions makes it possible to shorten the required printing time and the printing wait time. The monitor 120 is connected to the control device 110, and displays various types of user interface screens (UI screens).

The printers 1 to 3 (130a to 130c) print a color image onto a sheet based on a print job from the control device 110, using an electrophotographic process technique, for example. The sheets according to the present embodiment include various types of sheets, such as plain paper, heavy paper, OHP sheets, and the like. The printers 1 to 3 may be black-and-white printers, or may be printers based on other image forming techniques such as ink jet or the like. The printers 1 to 3 may be multifunction peripherals having a copying function, a fax function, or the like in addition to a printing function.

The measurement devices 1 to 3 (150a to 150c) are spectrometers which measure the chromaticity value of a target object based on the reflectance or transmittance of visible light having a wavelength of approximately 400 nm to 700 nm. The measurement devices 1 to 3 are prepared for each base, for example, and the wavelengths obtained for each patch of the chart printed by the printers 1 to 3, for example, are converted into values in the L*a*b* color space, the XYZ color space, or the like to obtain colorimetric data. 200 in FIG. 2 indicates an example of the chart. 201 in FIG. 2 expresses target colorimetric values corresponding to each patch (patch numbers 1 to 736) of the chart as RGB values. The target colorimetric values may be held after converting from RGB to the CMYK color space.

The measurement devices 1 to 3 are measurement devices that include a line sensor, an area sensor, or the like for scanning a chart. For example, in the case of a "sheet-through" automatic document-reading measurement device, including a line sensor makes it possible to pre-scan the chart, and the measurement can be taken after detecting the position of the patch to be measured. Similarly, if the measurement device is capable of continuous measurement by automatically feeding sheets, including an area sensor makes it possible to pre-scan the chart, and the measurement can be taken after detecting the position of the patch to be measured. In the case of a "sheet-through" automatic document-reading measurement device, a chart printed out by a target printer, connected to the control device 110 by USB or the like, for example, is set in the measurement device manually by a user. Note that the method of connecting the measurement devices 1 to 3 to the control device 110 are not intended to be limited, and these devices may instead be connected over a network such as a wired or wireless LAN, for example. The measurement device then starts feeding the chart, measures the chromaticity values of each patch on the chart, and obtains colorimetric data as indicated by 202 in FIG. 2. The obtained colorimetric data is transmitted to the color verification device 100 via the control device 110. If the color verification device 100 is installed in one of the bases 1 to 3, the color verification device 100 and the measurement devices may be directly connected at the base, and the color verification device 100 may be configured to obtain the colorimetric data without going through the control device 110.

The network 160 may be, for example, a local area network (LAN), the Internet, an intranet, or the like, and may be wired or wireless. The bases 1 to 3 (170a to 170c) correspond to locations or the like where printing companies, in which printers are installed, are located. For example, this could mean that the base 1 is a printing base in Tokyo, the base 2 is a printing base in Osaka, and the base 3 is a printing base in Fukuoka. Note that the configuration of the color verification system illustrated in FIG. 1 is merely one example, and the number of bases, the configuration of the devices within the bases, and the like can be changed as appropriate. For example, the configuration may be such that the color verification device 100 is directly connected to the control device 110, the measurement devices 1 to 3, and the like over a communication network such as an intranet, and the color accuracy of the plurality of printers 1 to 3 is managed in such a state. For example, an information processing apparatus including functions of both the color verification device 100 and the control device 110 may be provided in each base, and the information processing apparatus may be configured to manage the color accuracy of a plurality of printers at the base.

Hardware Configuration of Information Processing Apparatus

The hardware configuration of the information processing apparatus according to the present embodiment will be described next with reference to FIG. 3. The information processing apparatus according to the present embodiment corresponds to at least one of the above-described color verification device 100 and control device 110, and is implemented by, for example, a general-purpose laptop/desktop personal computer, a tablet terminal, or the like.

The color verification device 100/control device 110 each includes a CPU 101, a ROM 102, a RAM 103, an HDD 104, a display unit 105, an operating unit 106, a network I/F 107, and an external device I/F 108. The units 101 to 108 are connected by a system bus 109 so as to be capable of exchanging data with each other.

The CPU 101 is an arithmetic processing unit that controls the apparatus as a whole, and executes various types of processing (described later) based on programs stored in the ROM 102. The ROM 102 is a read-only memory that stores a boot program, processing programs, character data, character code information, and the like. The RAM 103 is a random access memory, and is used as work memory when the CPU 101 executes various types of programs. The RAM 103 is also used as a data storage area for image files received from the network I/F 107. The HDD 104 is used to store results of operational processes executed by the CPU 101, various types of programs, various information files, and the like.

The display unit 105 is constituted by, for example, a liquid crystal display or the like, and displays user interface screens for making various types of settings, confirming the states of devices, and the like. The operating unit 106 is constituted by a keyboard, buttons, and the like, and is used by the user to input or reset various types of setting values. The network I/F 107 is an interface for connecting the device to the network 160. The color verification device 100 and the control device 110 can each transmit and receive various types of information to and from an external device through the network I/F 107. The external device I/F 108 is an interface for connecting external devices such as the measurement devices 1 to 3 over a communication bus such as a Universal Serial Bus (USB), for example.

Software Configuration of Information Processing Apparatus

The software configuration of the information processing apparatus (the color verification device 100/the control device 110) according to the present embodiment will be described next with reference to FIG. 4. Only the main functional configurations according to the present invention will be described here. This therefore is not intended to exclude other configurations.

The color verification device 100/control device 110 includes a color verification specification registration unit 401, a UI control unit 402, a data obtainment unit 403, a sheet detection unit 404, a measurement unit 405, a verification processing unit 406, and a setting processing unit 407. These functional units are realized by the CPU 101 executing predetermined programs. Each functional unit will be described hereinafter.

The color verification specification registration unit 401 registers, for each of types of color verification, a chart in which various color patches corresponding to target colorimetric values are arranged, a printer subject to color verification, a measurement device to be used for the color verification, tolerance values for the color verification, and the like. Specifically, the chart to be registered associates image data with information indicating the configuration of the chart, such as the number of patches in the chart, the size of the chart, and the like (chart configuration information), and that chart is stored in the HDD 104. Charts are roughly divided into predefined charts based on a printing authentication standard such as JapanColor or the like, and custom charts uniquely defined by the user. A predefined chart is registered in advance prior to the start of use, such as when a color verification program is installed, for example. A custom chart is registered at any timing based on user input made through the operating unit 106. A printer subject to the color verification is registered from among the printers 130a, 130b, and 130c connected to the control device 110. In addition, a measurement device to be used for the color verification is registered from among the measurement devices 150a, 150b, and 150c used for color verification. The tolerance values used in color verification are values used when checking that the color accuracy meets an acceptance standard by comparing a color serving as a target (a target color) determined by a printing authentication standard, such as JapanColor, with a color actually printed by the printer (a print color). For example, when making a determination based on the difference (color difference) between the chromaticity value of the target color (a target value) and the chromaticity value of the print color (a measured value), the value of the color difference is registered as a tolerance value, and the color accuracy is determined to meet the acceptance standard when the value thereof is within the tolerance value. When executing color verification, the color verification is started by the user selecting a color verification specification from among color verification specifications registered in the color verification specification registration unit 401.

The UI control unit 402 performs display control for user interface screens through which the user confirms the status of the various devices in the color verification system, inputs and selects various types of setting values, instructs the start of various types of processing, and the like. The user interface screens displayed will be described later. The data obtainment unit 403 obtains various types of information and data used by the measurement unit 405, the verification processing unit 406, and the like, which will be described later.

The sheet detection unit 404 detects whether the chart output from the printer 130a (or the printer 130b or 130c) has been set in the measurement device 150a (or the measurement device 150b or 150c) in accordance with a predetermined detection condition (a first detection condition). Additionally, after the measurement by the measurement unit 405 is complete and the chart has been discharged (described later), whether the user has removed the chart from the measurement device is detected in accordance with a predetermined detection condition (a second detection condition). In other words, the sheet detection unit 404 detects charts (sheets) manually placed by the user in the measurement devices 150a, 150b, and 150c before the start of measurement, and detects that discharged charts have been removed from the measurement devices by the user after the measurement.

The measurement unit 405 instructs a chart to be pre-scanned after the sheet detection unit 404 detects that a chart has been set. Then, by the measurement device 150a pre-scanning the chart, the number of patches (vertical and horizontal) arranged in the chart, and position information thereof, are detected. An instruction to measure the chart is then issued, and the chromaticity value of each patch in the chart is measured by the measurement device 150a.

The verification processing unit 406 executes verification processing for verifying whether the color accuracy of the target printer has reached the acceptance standard using the colorimetric data received from the measurement device 150a. The setting processing unit 407 sets various types of parameters related to the verification processing based on user selections and the like made through a predetermined user interface screen.

Configuration of Measurement Device

Figure 11:
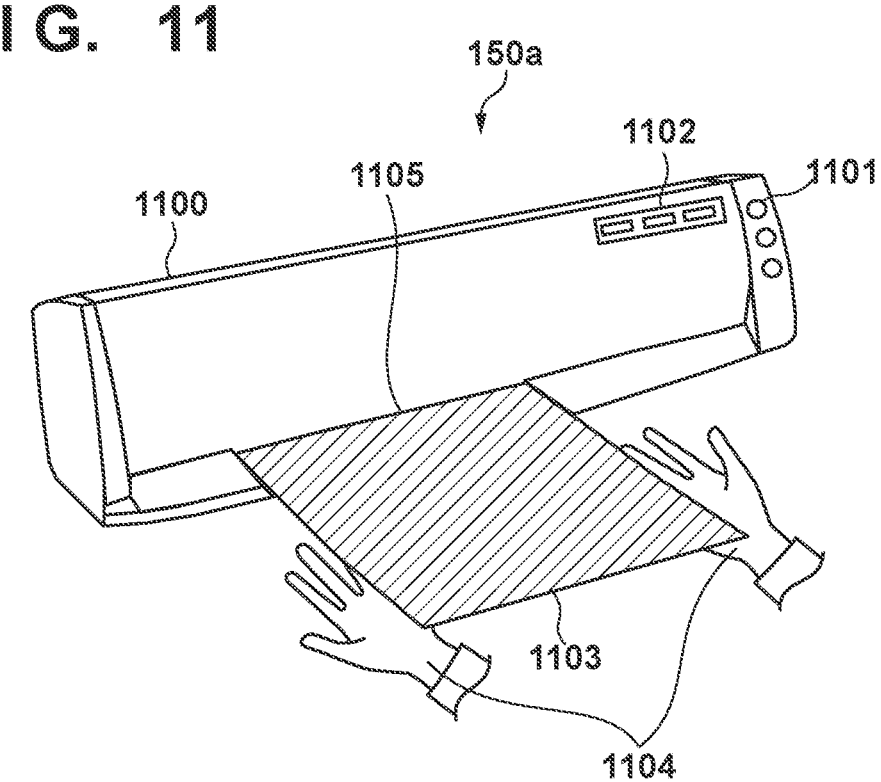
FIG. 11 is a diagram illustrating an example of the configuration of a measurement device according to one embodiment.

An example of the configuration of the measurement device 150a according to the present embodiment will be described next with reference to FIG. 11. The configurations of the measurement devices 150a, 150b, and 150c are the same, and thus the configuration of the measurement device 150a will be described here as a representative example.

The measurement device 150a includes a measurement device main body unit 1100, a button 1101, an LED display unit 1102, and a sheet feed port 1105. The main body unit 1100 includes a sensor that detects that a sheet 1103, such as a chart or the like, has been set in the sheet feed port 1105, which is an opening, and the detected sheet 1103 is pulled inside. Furthermore, an illumination unit that emits illumination light onto a target object, and a light-receiving unit that receives reflected light produced by the target object reflecting the illumination light, are provided within the main body. The configuration including the illumination unit and the light-receiving unit makes it possible to perform color measurement of the target object. A measurement result is output to the control device 110.

The button 1101 is a start button for starting the pull-in of the sheet 1103 to be measured, which has been set in the sheet feed port 1105 by the user. The user can start a measurement by pressing the button 1101 after setting the sheet 1103 to be measured. Note that the measurement device 150a according to the present embodiment has a function for automatically starting the pull-in of the sheet 1103, in addition to using manual start instructions produced by the user pressing the button 1101. Switching between manual and automatic can be performed using a measurement options screen illustrated in FIG. 10 (described later). Details will be given below.

The LED display unit 1102 includes a plurality of indicators, such as light-emitting diode (LED) lamps or the like, and each is controlled to a lighted state, an extinguished state, or a flashing state in accordance with the state of the measurement device 150a. Although an LED is described here as an example, the present invention is not intended to be limited thereto, and another type of display unit, such as a liquid crystal display unit, can also be applied. The LED display unit 1102 indicates whether the sheet 1103 is set in the sheet feed port 1105 based on the lighted state, for example.

As indicated by 1104, the user sets the sheet 1103 in the measurement device 150a by hand. In this case, if the function for automatically pulling in the sheet is set, it is possible that the pulling of the sheet into the device will start before the user releases their hand from the sheet 1103. In this manner, the pull-in being started while the user's hand is in contact with the sheet 1103 can cause wrinkles, folded corners, and the like, causing the positions of the patches formed on the sheet 1103 to shift, such that accurate measurements cannot be taken. Accordingly, it is desirable for the measurement device 150a to start the pull-in after waiting long enough for the user to remove their hand from the sheet 1103 after setting the sheet 1103 in the sheet feed port 1105. In other words, rather than determining that the sheet is present immediately after the sheet 1103 is set, it is desirable for the measurement device 150a to determine that the sheet is present after a predetermined length of time has passed.

On the other hand, although the sheet 1103 is discharged from the main body unit 1100 after the measurement, it is still necessary to remove the sheet 1103 in order to take the next measurement, and in this case, the sheet 1103 is detected using a sensor provided in the main body unit 1100. However, as described above, unlike the case where the pull-in is started after the sheet is detected as being set, if the sheet is detected as having been removed, it is desirable to determine that there is no sheet immediately after the sheet is removed and prompt the user to set the next sheet to be measured. In other words, if it is detected that the sheet has been removed, it is desirable to quickly detect that there is no sheet without delay.

Therefore, according to the present embodiment, a condition for detecting that a sheet (a chart) is set (the first detection condition) and a condition for detecting that a sheet is not set (the second detection condition) are different detection conditions from each other. As such, according to the present embodiment, it is possible to both prevent measurement defects caused by wrinkles, folded corners, and the like when manually setting a sheet in a measurement device, and improve the convenience for the user. A specific method will be described hereinafter.

Processing Sequence of Overall System

A processing sequence when performing color verification in the color verification system according to the present embodiment will be described next with reference to FIGS. 5A and 5B. In the processing sequence described hereinafter, it is assumed a plurality of color verifications are performed for the printer 130a using the measurement device 150a by outputting a plurality of charts. Additionally, although the various types of operation screens described hereinafter will be described as examples displayed in the display unit 105 of the color verification device 100, the present invention is not limited thereto, and the screens may be displayed in the display unit 105 of the control device 110, another display unit, or the like. Note that in the following descriptions, "S" stands for "step".

Figure 6A:
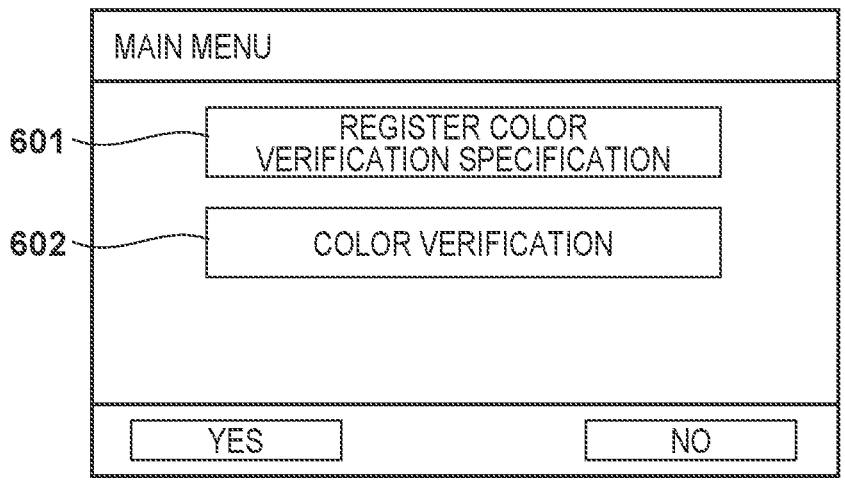
FIGS. 6A to 6C are diagrams illustrating an example of a display unit 105 according to one embodiment.

First, in step S501, the color verification specification registration unit 401 starts the color verification specification registration based on a user input. When a user who wishes to register a color verification specification selects a color verification specification registration button 601 in a main menu screen illustrated in FIG. 6A, the screen transitions to a color verification specification registration screen illustrated in FIG. 6B. Note that the control of these UI screens is performed by the UI control unit 402.

Figure 6B:
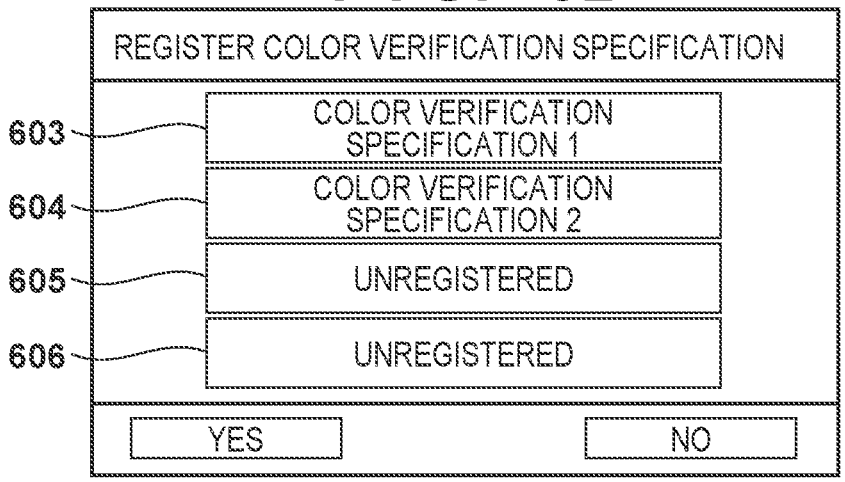
Figure 6C:
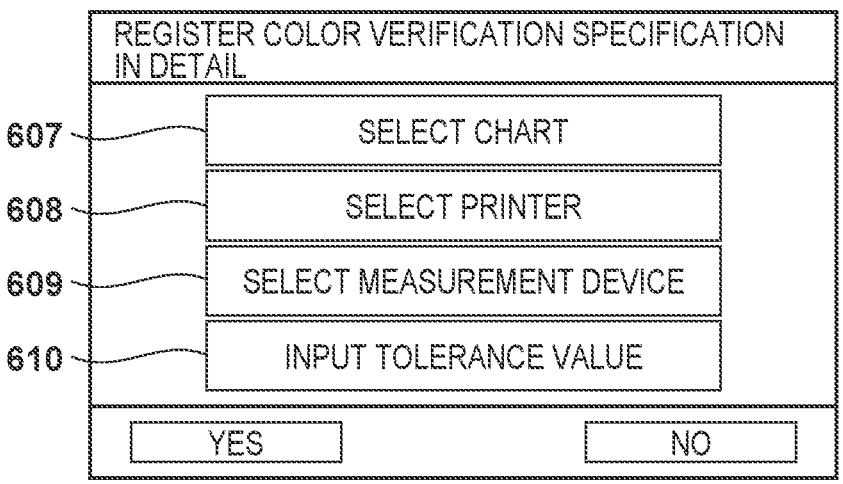

When a color verification specification to be registered/edited is selected in display areas 603 to 606 of the color verification specification registration screen illustrated in FIG. 6B, the screen transitions to a color verification specification detailed selection screen illustrated in FIG. 6C. The display areas 603 and 604 indicate color verification specifications that have already been registered, and the display regions 605 and 606 indicate that nothing is registered. Selecting a color verification specification that has already been registered makes it possible to edit the specification, whereas a new color verification specification can be registered by selecting an unregistered item. The color verification specification detailed selection screen illustrated in FIG. 6C includes display areas 607 to 610, and settings pertaining to the respective color verification specifications can be made here.

Figure 6D:
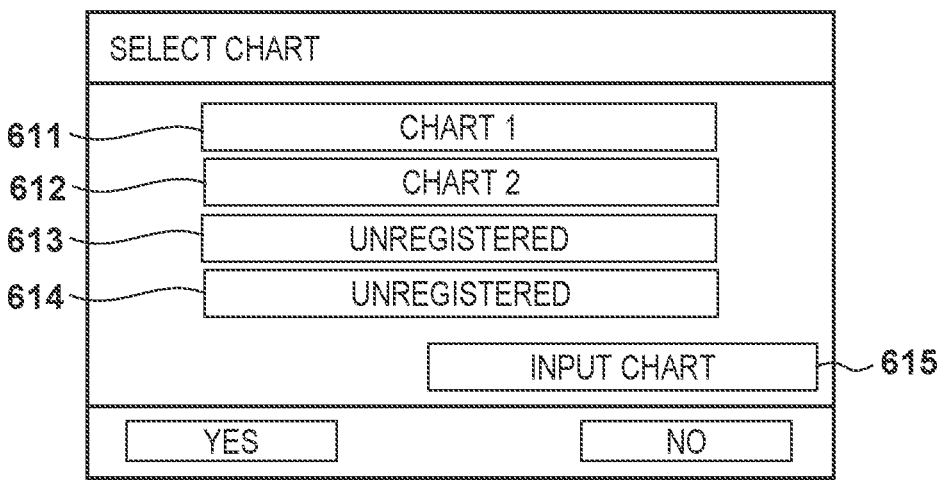
FIGS. 6D to 6F are diagrams illustrating an example of a display unit 105 according to one embodiment.

When "select a chart" in the display area 607 is selected in the color verification specification detailed selection screen illustrated in FIG. 6C, the screen transitions to a chart selection screen illustrated in FIG. 6D. The user selects the chart to be used for color verification from display areas 611 to 614 in the chart selection screen illustrated in FIG. 6D. "Chart 1" and "chart 2" in the display areas 611 and 612 in the chart selection screen illustrated in FIG. 6D are pre-registered predefined charts set according to a printing authentication standard such as JapanColor. When the user selects a chart input button 615, the user can input various types of information necessary for registering a custom chart. Specifically, the registration is completed by inputting a name, a number of patches, a patch size, a sheet size/type, and the like pertaining to the custom chart to be registered, and uploading image data. A chart image is created in a file format such as TIFF, PDF, JPEG, or the like. As a result, the chart is registered in the "unregistered" display areas 613 and 614 of the chart selection screen illustrated in FIG. 6D. Note that a list of registered charts and the chart configuration information for each chart will be collectively referred to as "chart information".

Next, in step S502, the data obtainment unit 403 obtains a list of the printers 1 to 3 managed by the control device 110, and information indicating the status of each printer (called "printer status information" hereinafter), from the control device 110. Here, the printer status information includes information such as, for example, the power state (on/off), whether there is a malfunction, and the processing status of a print job (printing or standing by). This printer status information is assumed to be obtained and held by the control device 110 periodically accessing the printers 1 to 3. Note that hereinafter, the list of printers and the printer status information for each printer will be collectively referred to as "printer information".

Next, in step S503, the color verification specification registration unit 401 accepts the selection of "select printer" in the display area 608 of the detailed selection screen illustrated in FIG. 6C. Upon accepting a printer selection, the UI control unit 402 transitions to a printer selection screen illustrated in FIG. 6E, where processing for accepting the selection of a printer subject to color verification (called a "target printer" hereinafter) is executed. Specifically, the UI control unit 402 accepts the user's selection through the UI screen displayed in the display unit 105, and the setting processing unit 407 sets the printer involved in that selection (here, the printer 1) as the target printer.

Figure 6E:
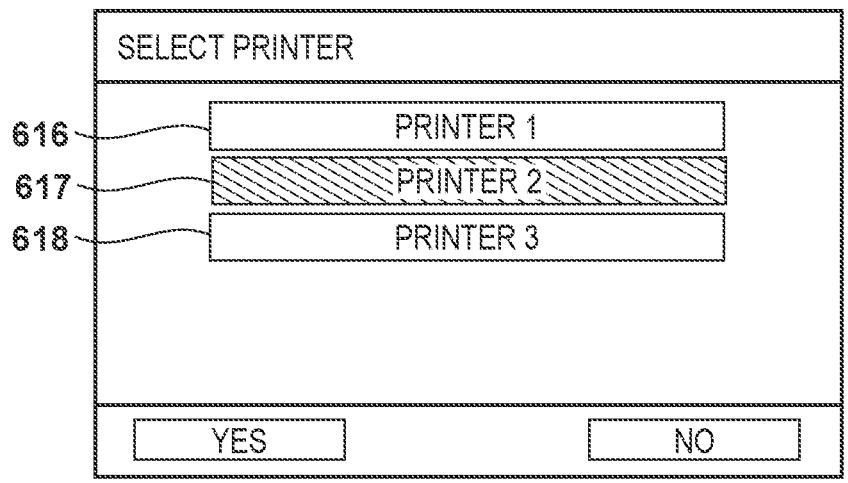

FIG. 6E illustrates the printer selection screen displayed when the user selects the target printer. Printers that can be targets of the processing (here, the printers 1 to 3) are displayed as a list, in accordance with the printer information obtained in step S502, in display areas 616 to 618 of the printer selection screen. At this time, based on the printer status information, a gray-out display process is performed for a printer which is not capable of printing, for example, such that whether a printer is capable of printing or not can be determined. In the printer selection screen illustrated in FIG. 6E, only the printer 2 is grayed out, which indicates that the printer 2 is not capable of printing.

Next, in step S504, the data obtainment unit 403 obtains, from the control device 110, a list of the measurement devices 1 to 3 managed by the control device 110, specification information of the respective measurement devices, and information indicating the status of the respective measurement devices (called "measurement device status information" hereinafter). Here, the specification information is information indicating the specifications for each measurement device, such as a compatible sheet size, a minimum patch size, and a minimum/maximum number of patches per sheet (per page). The specification information also includes differences in specifications according to whether accessories are present, for measurement devices for which accessories are available. Here, "accessories" refers to measurement rulers, automatic sheet feed units, and the like. A measurement ruler is a device that aids slide operation during measurement by enabling stable color measurement in a compact-type measurement device. A position sensor on the underside of the measurement device detects a stripe on the ruler, which makes it possible to detect the direction in which the user is measuring (measurement from left to right, measurement from right to left, or the like.). An automatic sheet feed unit is a device capable of automatically taking a chart printed and output from a printer into the measurement device and performing continuous color measurement. The measurement device status information includes information such as, for example, the power state (on/off) and a connection status. The specification information and the measurement device status information are assumed to be obtained by the control device 110 in advance, or by periodically accessing the measurement devices 1 to 3, and held. Note that a list of measurement devices, the specification information for each measurement device, and the measurement device status information will be collectively referred to as "measurement device information".

Figure 6F:
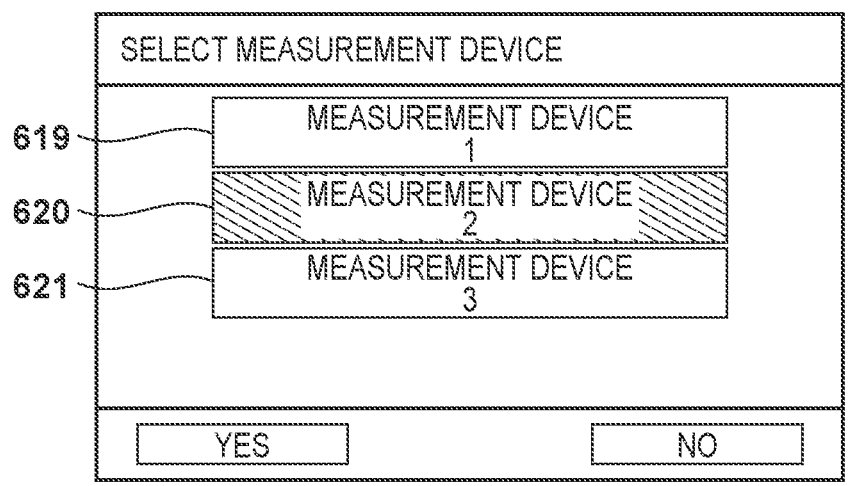

Next, in step S505, the color verification specification registration unit 401 accepts the selection of "select measurement device" in the display area 609 of the detailed selection screen illustrated in FIG. 6C. Upon "select measurement device" being accepted, the UI control unit 402 transitions to a measurement device selection screen illustrated in FIG. 6F, and executes processing for accepting the selection of a measurement device to be used to measure the chromaticity values of the chart. Specifically, the UI control unit 402 accepts the user's selection through the UI screen displayed in the display unit 105, and the setting processing unit 407 sets the measurement device indicated by the selection as the measurement device to be used for chart measurement. FIG. 6F illustrates the measurement device selection screen when the user selects the measurement device. A list of the measurement devices that can be used for the processing (here, the measurement devices 1 to 3) is displayed in display areas 619 to 621 of the measurement device selection screen, in accordance with the measurement device information obtained in step S504. At this time, based on the measurement device status information, a gray-out display process is performed for a measurement device which cannot be used, for example, such that whether the measurement device can be used or not can be determined. In the measurement device selection screen illustrated in FIG. 6F, only the measurement device 2 is grayed out, indicating that the measurement device 2 cannot be used.

Next, in step S506, the color verification specification registration unit 401 accepts the selection of "input tolerance value" in the display area 610 of the detailed selection screen illustrated in FIG. 6C. Upon accepting the selection of "input tolerance value", the UI control unit 402 transitions to a tolerance value input screen illustrated in FIG. 6G, and executes processing for accepting data such as tolerance values for the target colorimetric value, verification items, and the like for each patch in the chart used. Specifically, the user's selection is accepted by the UI control unit 402 through a UI screen displayed in the display unit 105, and the setting processing unit 407 sets the tolerance values for the target colorimetric value, the verification items, and the like according to the selection. FIG. 6G illustrates the tolerance value input screen when the user inputs a tolerance value for a verification item. An average value of a color difference ΔE, a maximum value of the color difference ΔE, and the color difference ΔE of a single color (CMYK), for each patch, for example, are used as the verification items, and a tolerance value is set for each of the verification items. Through such a UI screen, the user sets tolerance values in accordance with the verification items in advance. Here, the color difference ΔE is a linear distance between the target chromaticity value in the L*a*b* color space and the chromaticity value (colorimetric value) indicated by the colorimetric data, and can be obtained, for example, through the following Formula (1).

$$\Delta E = \sqrt{\Delta L^2 + \Delta a^2 + \Delta b^2}$$

$$\Delta L = L_1 - L_2$$

$$\Delta a = a_1 - a_2$$

$$\Delta b = b_1 - b_2 \quad (1)$$

It is assumed here that a tolerance value for the color difference is set for each verification item, as indicated by a color verification setting screen illustrated in FIG. 6G. In this case, a pass (OK) is determined if the average value of the color difference ΔE for each patch is within ±4.0, the maximum value of the color difference ΔE is within ±10.0, and the color difference ΔE (ΔE_single color) of a single color (CMYK) is within ±5.0. On the other hand, a failure (NG) is determined when the tolerance value is exceeded for any of the verification items.

Next, in step S507, the verification processing unit 406 starts the color verification based on the user inputs. When a user who wishes to start color verification specification selects a color verification button 602 in the main menu screen illustrated in FIG. 6A, the UI control unit 402 transitions to a color verification specification selection screen illustrated in FIG. 6H. Next, in step S508, when "color verification specification 1" in a display area 625 or a "color verification specification 2" in a display area 626 is selected in the color verification specification selection screen illustrated in FIG. 6H, the verification processing unit 406 generates a measurement job corresponding to that color verification specification and transmits the job to the control device 110. When the measurement job is generated, the printer subject to color verification, the measurement device to be used, the chart to be used for the color verification, and the tolerance values, registered in the sequence from steps S501 to S506, are uniquely determined.

Next, in step S509, the control device 110 transmits a print job for the plurality of charts to the target printer (here, the printer 130*a*) based on the received image data. Upon receiving the print job, in step S510, the printer 130*a* executes printing processing based on the print job, and outputs a plurality of charts.

Next, in step S511, the control device 110 confirms whether there is a measurement device, among the measurement devices connected to the control device 110 (here, the measurement devices 150*a*, 150*b*, and 150*c*) which can be used. Specifically, the control device 110 confirms the measurement device status information and determines the measurement devices that can be used. It is assumed here that the measurement device 1 (the measurement device 150*a*) can be used.

Next, in step S512, the sheet detection unit 404 transmits a sheet detection instruction to the measurement device 150*a* in accordance with a predetermined detection condition. The detection condition pertaining to the sheet detection instruction will be described with reference to FIG. 7. As indicated by 701, the time interval for the sheet detection instruction for sheet reset detection (sheet absent detection) is set to 0.5 seconds in advance, whereas the time interval for a sheet detection execution instruction is set to 0.5 seconds in step S527 (described later). In other words, the control device 110 repeatedly transmits the sheet detection instruction to the measurement device 150*a* in accordance with the time interval of 0.5 seconds for the sheet detection execution instruction of the sheet detection unit 404, which is the second detection condition. "Sheet reset detection" is detecting that a sheet has been removed from the target measurement device.

Parameters pertaining to state transitions, such as those shown in Table 1, are prepared in the HDD 104 of the control device 110. "isNextPage" is a parameter for notifying the start of a sheet removal check. "State" is a parameter expressing the state of the measurement device internally. "isOldPaperRemoved" is a parameter holding whether a sheet has been removed. In the aforementioned step S512, "State" is set to "CheckingOldPaperRemoved", indicating that whether the sheet has been removed is currently being checked. Detailed descriptions will be given later in conjunction with each step.

TABLE 1

| Parameter | Value | Description |
| --- | --- | --- |
| isNextPage | TRUE | Light LED of measurement device in blue |
| | FALSE | Light LED of measurement device in red |

TABLE 1-continued

| Parameter | Value | Description |
|---|---|---|
| State | Waiting | Standing by |
|  | CheckingOldPaperRemoved | Checking whether sheet has been removed |
|  | ReadyToPreScan | Standing by for PreScan |
|  | ReadyToMeasure | Standing by for measurement |
| isOldPaperRemoved | TRUE | Sheet already removed |
|  | FALSE | Sheet not yet removed |

Next, in step S513, the measurement device 150a confirms whether a sheet is set in the measurement device in accordance with the sheet detection instruction for the sheet reset detection performed in step S512. A sensor that detects sheets is provided in the measurement device 150a, and whether a sheet is set in the measurement device can be detected using that sensor. Then, in step S514, the measurement device 150a transmits the result of the sheet reset detection in step S513 to the control device 110. If the detection result in step S513 is "sheet absent", the control device 110 sets "isOldPaperRemoved", held in the HDD 104 of the control device 110, to "True", indicating that the sheet has been removed. Additionally, by setting "isNextPage" to "True", the control device 110 causes the LED of the measurement device to light up in blue, which notifies the user that a sheet can be set. Note that the notification of the result of the sheet reset detection is performed repeatedly in accordance with the instruction for the sheet reset detection in step S512.

Figure 10:
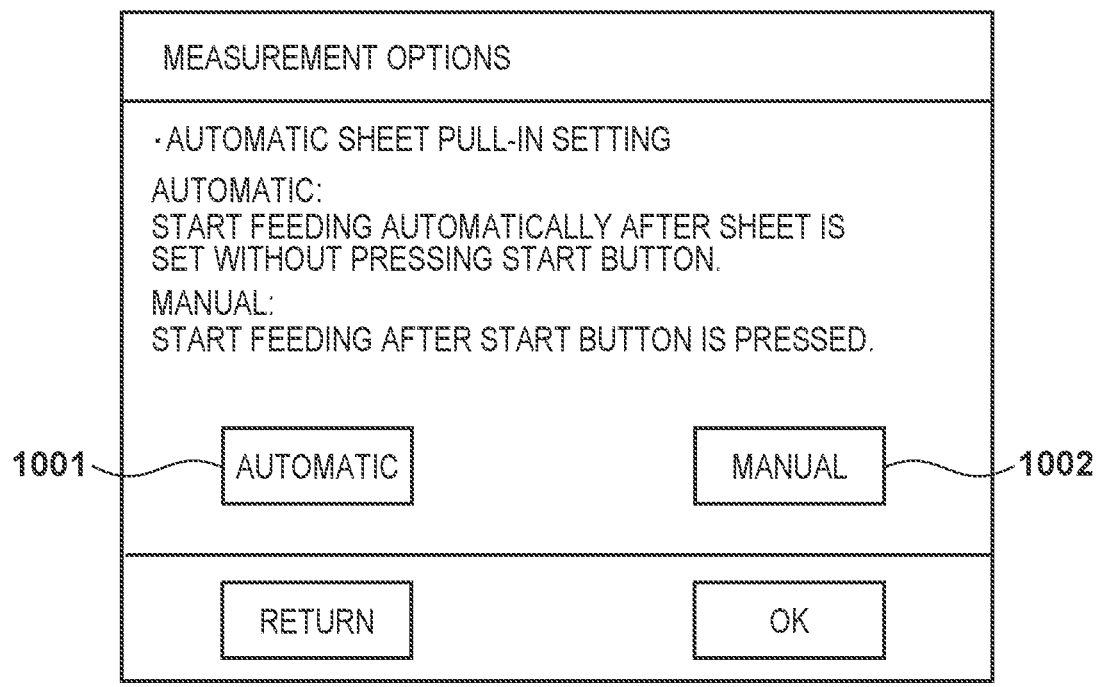
FIG. 10 is a diagram illustrating an example of the display unit 105 according to one embodiment.

Next, in step S515, the measurement device 150a detects a measurement start button of the measurement device being pressed by the user, and in step S515-2, when the button being pressed is detected, notifies the control device 110 that starting the measurement has been selected. The control device 110 sets the "State" held in the HDD 104 to "ReadyToPreScan", indicating that the device is standing by for PreScan. Note that the configuration may be such that a measurement options screen, such as that illustrated in FIG. 10, is displayed using the display unit 105, enabling the user to switch to an automatic sheet pull-in setting. When an "auto" button indicated by 1001 in FIG. 10 is selected, the processing of step S515 is skipped, and the sequence moves to step S516 without detecting whether the measurement start button has been pressed. In other words, selecting the "auto" button 1001 activates a setting to detect the sheets set in the measurement device and start reading automatically. On the other hand, the configuration is such that when a "manual" button, indicated by 1002 in FIG. 10, is selected, the sequence moves to step S516 after the measurement start button is detected through step S515 as described above. In other words, selecting the "manual" button 1002 activates a setting to detect the sheets set in the measurement device and start reading after the start button is selected.

Next, in step S516, the sheet detection unit 404 refers to "isOldPaperRemoved", held in the HDD 104 of the control device 110, and determines whether "isOldPaperRemoved" is "True", which indicates that the sheet has been removed. If the result is "True", the sequence moves to step S517, and if "False", the sequence moves to step S518.

In step S517, when "isOldPaperRemoved" is determined to be "False", indicating that the sheet has not been removed, the UI control unit 402 notifies the user to remove the chart that is still present after being discharged previously, as indicated in FIG. 6K. The control device 110 then sets "State" to "Waiting", indicating that the device is standing by, and the sequence then returns to step S515.

On the other hand, in step S518, when it has been determined in step S516 that "isOldPaperRemoved" is "True", indicating that the sheet has been removed, the sheet detection unit 404 switches the time interval of the sheet detection execution instruction to the interval for sheet set detection. Here, the time interval for sheet set detection (sheet present detection) is set to five seconds in advance, as indicated by 702 in FIG. 7, and thus the time interval for the sheet detection execution instruction (the first detection condition) is set to five seconds. Unlike a sheet reset (the second detection condition), in the setting of the sheet, the sheet it pulled back into the measurement device after being detected, and thus a sufficient length of time is ensured for the user to release the sheet. This is because, for example, if the sheet is still being touched (e.g., the sheet is being held) by the user who is loading the sheet at the time when the sheet is pulled in, the sheet may be misaligned due to force from the user when the sheet is pulled, resulting in measurement defects due to wrinkles, folded corners, or the like. Accordingly, it is desirable that a sufficient length of time be secured for the user to release the sheet after setting the sheet in the measurement device, with respect to the time interval of the sheet detection execution instruction for sheet set detection. On the other hand, for sheet reset detection, the user removes the sheet from the measurement device, and the sheet is not subsequently pulled in, so it is desirable to reduce delay by providing the instruction at the shortest possible time interval. Next, in step S519, the sheet detection unit 404 repeatedly transmits the sheet detection instruction to the measurement device 150a in accordance with the five-second time interval of the sheet detection execution instruction set in step S518.

Then, in step S520, the measurement device 150a detects whether a sheet is set in the measurement device, in the same manner as in step S513. If the detection result indicates that a sheet is absent, in step S520-2, the measurement device 150a notifies the control device 110 of "sheet absent", and the UI control unit 402 of the control device 110 performs processing for prompting the user to measure the color of the printed-out chart from the target printer. Specifically, a guidance screen such as that illustrated in FIG. 6J is displayed, and the user is prompted to set the printed-out chart in the measurement device. On the other hand, when the detection result indicates that a sheet is present, the measurement device 150a notifies the control device 110 that a sheet is present. Note that the notification of the result of the sheet set detection is performed repeatedly in accordance with the instruction interval for the sheet set detection in step S519.

Next, in step S521, if the control device 110 has received a notification that a sheet is present in step S520, the control device 110 transmits, to the measurement device 150a, a pre-scan instruction for the printed-out chart from the target printer. In accordance with the pre-scan instruction, in step S522, the measurement device 150a executes a pre-scan of the chart. By executing a pre-scan first, the position of the patch to be measured in step S525 (described later) is detected. Then, in step S523, after the pre-scan is complete, the measurement device 150a transmits image data corresponding to the obtained chart to the control device 110. Then, in step S524, the control device 110 transmits, to the measurement device 150a, a measurement instruction for the chart printed out from the target printer. The control device 110 also sets "State" to "ReadyToMeasure", indicating that the device is standing by for measurement.

Next, in step S525, the measurement device 150a measures the chromaticity value of each patch in the chart. Next, in step S526, after the measurement is complete, the measurement device 150a transmits, to the control device 110, a measurement completion notification as well as the obtained colorimetric data. Then, in step S527, the sheet detection unit 404 switches the time interval of the sheet detection execution instruction to the interval for sheet reset detection. Taking FIG. 7 as an example, the time interval for sheet reset detection is 0.5 seconds, and thus the time interval of the sheet detection execution instruction is set to 0.5 seconds. Additionally, the control device 110 sets "isOldPaperRemoved" held in the HDD 104 to "False", indicating that the sheet has not been removed, and sets "isNextPage" to "False". Through this, the LED of the measurement device is lit up in red, and the user is notified that the sheet still remains after being discharged.

Next, in step S528, the control device 110 confirms whether all the charts in the measurement job generated in step S508 have been measured. In step S529, the control device 110 receives the colorimetric data (measurement result) from the measurement device 150a, and transfers that data to the color verification device 100. In step S530, the verification processing unit 406 executes processing for verifying the color accuracy of the printer associated with the corresponding measurement job using the stated data.

Then, in step S531, the UI control unit 402 displays a verification result in the display unit 105, after which the processing of this sequence ends. FIG. 6I illustrates a report result screen in which the verification result is displayed. As illustrated in FIG. 6I, the average value and the maximum value of the color difference, as well as the single-color (CMYK) color difference, for each patch, are displayed together with a pass/fail (OK/NG) result for each verification item. Note that in FIG. 6I, verification results are displayed for each patch, and it is therefore desirable to display the verification results for other patches using an operation such as scrolling. In addition, the verification results of the patches included in the chart may be displayed in a list, the pass/fail results can be displayed in an identifiable manner in the list, and selecting a predetermined patch may display detailed verification results for each patch, such as those illustrated in FIG. 6I. Such a report result screen enables the user to understand the state of color changes in the target printer. If the verification result is a failure (NG), color changes in the printer can be suppressed to within a prescribed range by recreating the printing profile, performing correction tasks using the color correction function of the printer, or the like.

The foregoing has described the flow of the overall processing performed by the color verification system according to the present embodiment. Note that the control device 110 may issue a preparation instruction to the selected measurement device in accordance with the display prompting the user to measure the color of the chart, and execute calibration before the measurement starts. A configuration has been described in which, in step S518, the detection interval when setting a sheet (five seconds) is made longer than the detection interval at the time of a sheet reset (0.5 seconds) by switching the time interval for sheet detection to five seconds, for detecting the setting of a sheet. However, this is not intended to limit the present invention, and the configuration may be such that the detection intervals are the same and a standby time is provided after detection only when a sheet is set.

The present embodiment describes an example in which the time interval of the sheet detection execution instruction during sheet present detection (sheet set detection) is set to five seconds, and the sheet detection execution instruction interval during sheet absent detection (sheet reset detection) is set to 0.5 seconds, as indicated in Table 2. Accordingly, setting the interval for sheet present detection to be longer than the interval for sheet absent detection secures time for the user to set the sheet in the measurement device, and the sheet can be set with some flexibility, which prevents measurement defects caused by wrinkles in the sheet, folded corners, and the like. On the other hand, setting the interval for sheet absent detection to a short interval enables quick detection and control from the start of the sheet absent detection in step S512 to the result of the sheet absent detection in step S514. This makes it possible to quickly transition to the measurement standby state (the LED of the measurement device lighting up in blue) when the user removes the sheet, which improves the convenience for the user. Meanwhile, as a variation, the time interval for the sheet detection execution instruction during sheet present detection may be set to two to ten seconds, and the time interval for the sheet detection execution instruction during sheet absent detection may be set to less than two seconds, as indicated in Table 2.

TABLE 2

| | Sheet present detection | Sheet absent detection | Description |
|---|---|---|---|
| First Embodiment | 5.0 s | 0.5 s | Sheet present detection interval > sheet absent detection interval |
| First Variation | 2 to 10 s | Less than 2 s | Same as above |

Processing Sequence by Information Processing Apparatus

Figure 12:
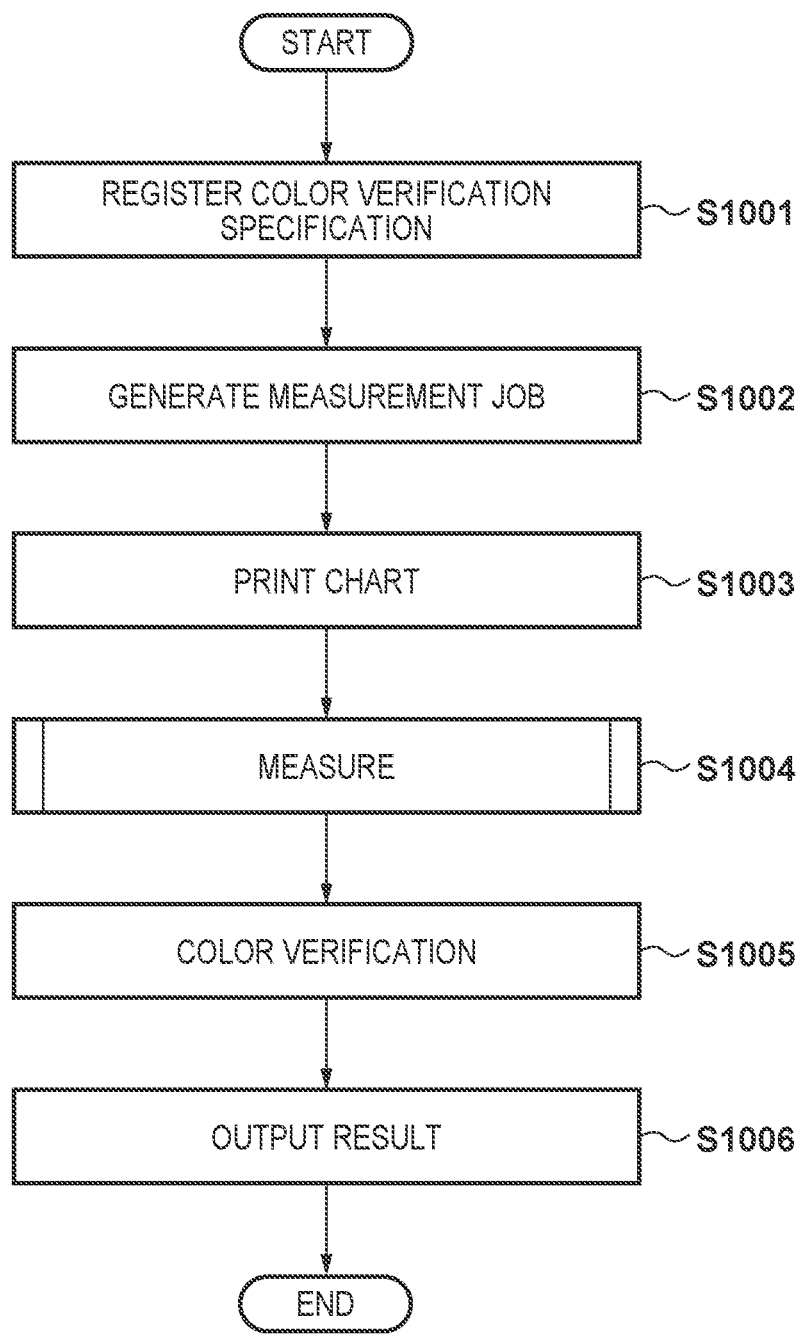
FIG. 12 is a flowchart illustrating a processing sequence of basic processing performed by an information processing apparatus according to one embodiment.
Figure 13:
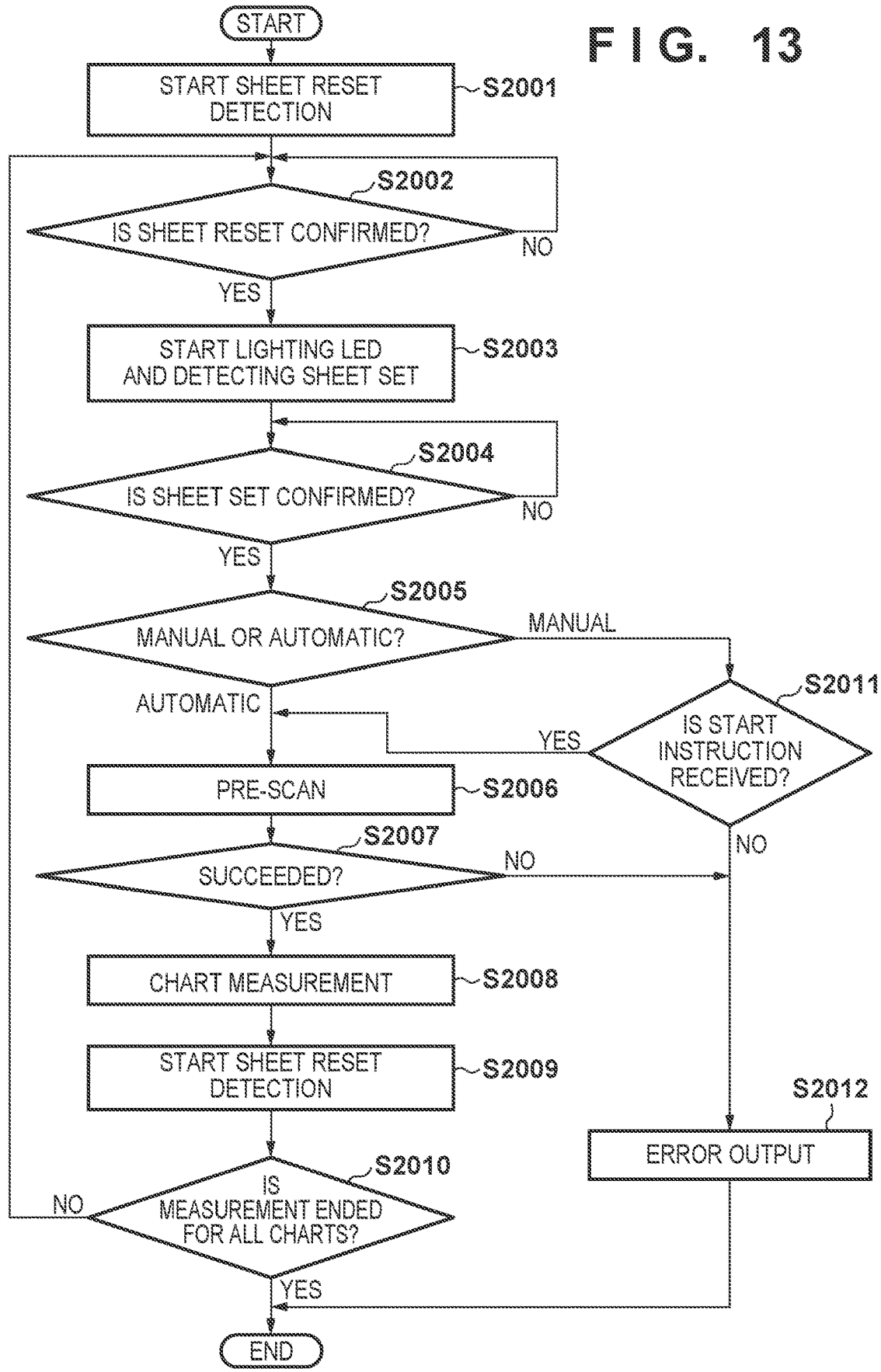
FIG. 13 is a flowchart illustrating a processing sequence of measurement processing performed by an information processing apparatus according to one embodiment.

A processing sequence by the information processing apparatus according to the present embodiment will be described next with reference to FIGS. 12 and 13. Processing by the information processing apparatus, including the color verification device 100 and the control device 110, will be described here. Note that the color verification device 100 and the control device 110 for a single base may be provided as the information processing apparatus in an integrated manner, or may be provided as separate devices as illustrated in FIG. 1. Although the processing will be described here as being performed by the information processing apparatus, if the color verification device 100 and the control device 110 are provided separately, the devices communicate as necessary between each instance of processing. The basic processing flows are the same, and the processing will therefore be described here as processing performed by the information processing apparatus.

Basic Flow

A processing sequence pertaining to a basic flow of color verification processing by the information processing apparatus according to the present embodiment will be described first with reference to FIG. 12. The processing described below is realized by the CPU 101 of the information processing apparatus, including the color verification device 100 and the control device 110, reading out a control program stored in the ROM 102, the HDD 104, or the like into the RAM 103 and executing that program. It is assumed that if the color verification device 100 and the control device 110 are provided separately, the processing of steps S1001, S1002, S1005, and S1006 is executed by the color verification device 100, and the processing of steps S1003 and S1004 is executed by the control device 110; however, the configuration is not particularly limited thereto.

In step S1001, the color verification specification registration unit 401 registers the color verification specification in accordance with input from the user. As described with reference to FIGS. 5A and 5B, here, the chart to be printed is selected, the printer is selected, the measurement device for measuring the printed chart is selected, and the tolerance values are set. Next, in step S1002, the color verification specification registration unit 401 generates a measurement job in accordance with the registered details. The generated job is communicated to the measurement unit 405 (or the control device 110).

Next, in step S1003, the measurement unit 405 causes the designated chart to be printed by the designated printer (e.g., the printer 130a) in accordance with the generated measurement job. Then, in step S1004, the measurement unit 405 measures at least one of the printed charts. The measurement processing will be described in detail later with reference to FIG. 13.

Once the measurement of the at least one printed chart is complete, in step S1005, the verification processing unit 406 executes color verification using the measurement result communicated from the measurement unit 405. Here, processing for verifying the color accuracy of the printer associated with the corresponding measurement job is executed. Then, in step S1006, the UI control unit 402 displays a verification result in the display unit 105, after which the processing of this flowchart ends.

Measurement Processing

A processing sequence for measurement processing by the information processing apparatus according to the present embodiment will be described next with reference to FIG. 13. The processing described below is realized by the CPU 101 of the information processing apparatus, including the color verification device 100 and the control device 110, reading out a control program stored in the ROM 102, the HDD 104, or the like into the RAM 103 and executing that program. A case where measurement is performed by the measurement device 150a will be described as an example here.

When the measurement processing is started, in step S2001, the sheet detection unit 404 starts detecting a sheet reset (sheet absent). Specifically, the sheet detection unit 404 sets the time interval for the sheet detection execution instruction to 0.5 seconds, and repeatedly notifies the measurement device 150a of the sheet detection instruction in accordance with the set time interval. In response to the notification, the measurement device 150a responds with an output indicating whether a chart has been detected by a sensor provided near the sheet feed port of the measurement device 150a. In step S2002, the sheet detection unit 404 determines whether a sheet reset has been confirmed in accordance with the response from the measurement device 150a. If a sheet reset is confirmed, the sequence moves to step S2003, and if not, the determination of step S2002 is repeated. Note that if a sheet reset is not confirmed even after a predetermined length of time has passed after the start of the determination, i.e., if a sheet such as a chart is not removed from the sheet feed port 1105 of the measurement device 150a, an error may be determined to have occurred, and the sequence may move to step S2012. Additionally, a message prompting the sheet to be removed may be displayed in a display unit such as the monitor 120, or lighting of the LED display unit 1102 of the measurement device 150a may be controlled to indicate that the sheet has not been removed.

In step S2003, the sheet detection unit 404 starts sheet set (sheet present) detection. Specifically, the sheet detection unit 404 causes the measurement device 150a to light a given LED in the LED display unit 1102 in blue, sets the time interval for the sheet detection execution instruction to five seconds, and repeatedly notifies the measurement device 150a of the sheet detection instruction in accordance with the set time interval. The response from the measurement device 150a is received in the same manner as in step S2001. Next, in step S2004, the sheet detection unit 404 determines whether a sheet being set has been confirmed in accordance with the response from the measurement device 150a. If a sheet being set is confirmed, the sequence moves to step S2005, and if not, the determination of step S2004 is repeated.

In step S2005, the measurement unit 405 determines whether the sheet pull-in setting is set to automatic or manual. As described with reference to FIG. 10, this setting is determined based on whether the "auto" button 1001 or the "manual" button 1002 is set in the measurement options screen. These settings are held in the HDD 104, for example, and the measurement unit 405 makes the determination by referring to that setting information in the HDD 104. The sequence moves to step S2006 if the sheet pull-in setting is set to automatic, and moves to step S2011 if the sheet pull-in setting is set to manual. In step S2011, the measurement unit 405 determines whether a start instruction has been issued by the user pressing the button 1101 in the measurement device 105a. The sequence moves to step S2006 if a start instruction has been issued. On the other hand, if a start instruction has not been issued even after a predetermined length of time passes, the sequence moves to step S2012.

In step S2006, the measurement unit 405 instructs the measurement device 150a to execute a pre-scan. The measurement device 150a starts pulling in the set chart and executes the pre-scan. The pre-scan detects the number of patches (vertical and horizontal) in the chart and the position information. Next, in step S2007, the measurement unit 405 determines whether the pre-scan has succeeded by comparing with the data in the chart selected in step S1001. The sequence moves to step S2008 if the pre-scan has succeeded, and moves to step S2012 if the pre-scan has failed.

In step S2008, the measurement unit 405 instructs the measurement device 150a to measure the chart. The measurement device 150a measures the chart and notifies the information processing apparatus of the measurement data. Upon receiving the measurement data, it is determined that the measurement of the chart is complete, and in step S2009, the sheet detection unit 404 starts detecting a sheet reset (sheet absent) to confirm that the discharged chart is removed. Then, in step S2010, the measurement unit 405 determines whether the measurement has ended for all the charts included in the measurement job. The sequence returns to step S2002 if the measurement has not ended, whereas the processing of this flowchart ends if the measurement has ended.

On the other hand, if the start instruction is not received in step S2011, the pre-scan has failed, or the like, in step S2012, the UI control unit 402 determines that an error has occurred, displays a message to that effect in the monitor 102, the display unit 105, or the like, and the processing of this flowchart then ends. In the event of termination due to an error, the color verification of step S1005 is skipped, and an error output is performed the result output in step S1006.

According to the present embodiment, when color patches arranged in a chart printed out from a printer are to be measured, sheet absent detection and sheet present detection are controlled under different conditions with respect to the time interval for sheet detection execution instructions. As such, it is possible to both prevent measurement defects caused by wrinkles, folded corners, and the like when manually setting a sheet in a measurement device, and improve the convenience for a user.

Second Embodiment

A second embodiment of the present invention will be described hereinafter. In the first embodiment, when measuring a color patch, a longer detection interval for sheet present detection than the detection interval for sheet absent detection is set with respect to the time interval of the sheet detection execution instruction, which makes it possible to both prevent measurement defects caused by wrinkles, folded corners, and the like when feeding sheets, and improve the convenience for the user. However, during sheet present detection, when the sheet is set at the end of the time interval of the sheet detection execution instruction (five seconds, in the first embodiment) (e.g., 4.5 seconds later), the sheet feeding is immediately started, and thus the sheet feeding is started 0.5 seconds later. There is thus a chance that the sheet feeding will start before the user has securely set the sheet, resulting in a risk that measurement defects caused by wrinkles, folded corners, and the like when feeding the sheet cannot be prevented. This point is therefore focused on in the present embodiment, in which the detection intervals for sheet absent detection and sheet present detection are set to be the same, and the number of consecutive detections for sheet present detection is set to be greater than the number of detections for sheet absent detection. This embodiment, which makes it possible to both prevent measurement defects caused by wrinkles, folded corners, and the like when feeding a sheet, and improve the convenience for the user, will be described next.

Note that the basic configuration, control, and the like of the color verification system are the same as in the first embodiment above, and will therefore not be described. The overall configuration of the color verification system according to the present embodiment is similar to in the first embodiment, and will therefore not be described. Additionally, the hardware configurations of the color verification device 100 and the control device 110 according to the present embodiment are similar to in the first embodiment, and will therefore not be described. Furthermore, the primary functional configurations of, and processing sequences by, the color verification device 100 and the control device 110 according to the present embodiment are similar to in the first embodiment, and will therefore not be described.

Processing Sequence of Overall System

Figure 8A:
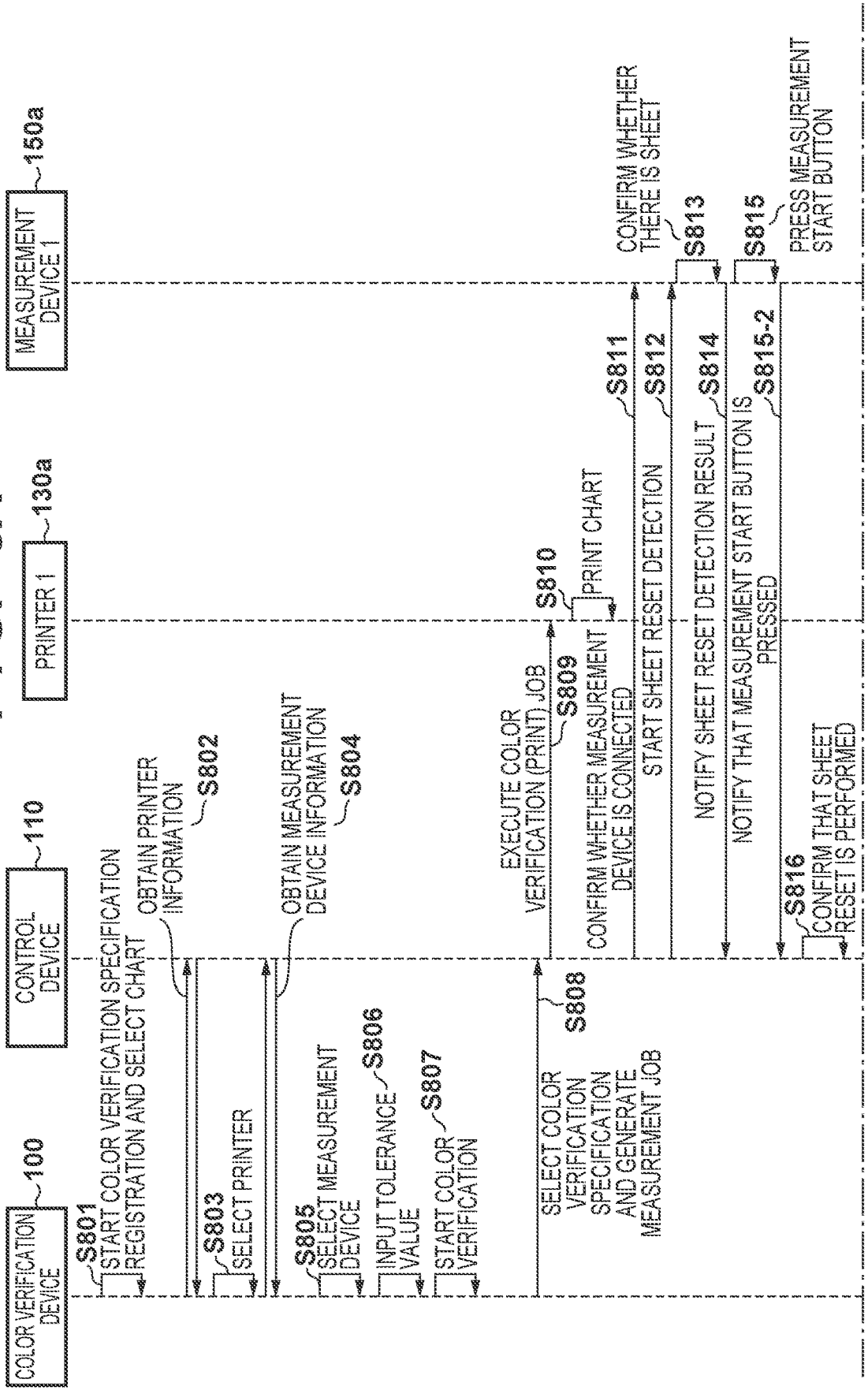
FIG. 8A is a sequence chart illustrating the flow of processing in the color verification system according to one embodiment.
Figure 8B:
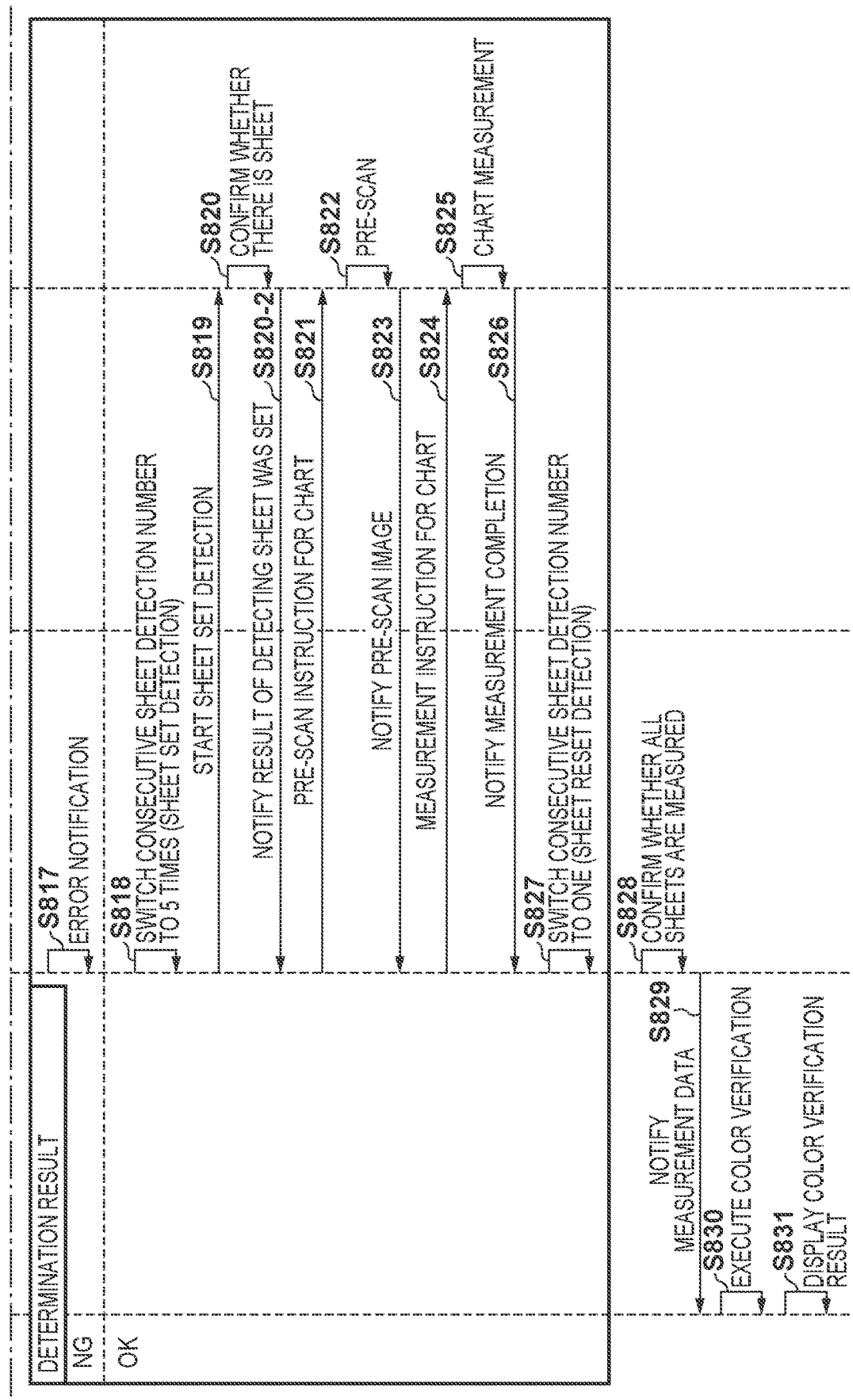
FIG. 8B is a sequence chart illustrating the flow of processing in the color verification system according to one embodiment.

A flow of processing in the color verification system according to the present embodiment will be described next with reference to FIGS. 8A and 8B. The following descriptions will focus upon the differences from the first embodiment. In the processing sequence described hereinafter, it is assumed a plurality of color verifications are performed for the printer 130a using the measurement device 150a by outputting a plurality of charts. Additionally, although the various types of operation screens described hereinafter will be described as examples displayed in the display unit 105 of the color verification device 100, the present invention is not limited thereto, and the screens may be displayed in the display unit 105 of the control device 110, another display unit, or the like. Note that in the following descriptions, "S" stands for "step". The processing from the start of the registration of the color verification specification in step S801 to the confirmation of the connection of the measurement device in step S811 is similar to that described in the first embodiment in steps S501 to S511 of the sequence chart in FIG. 5A, and will therefore not be described here.

In step S812, the sheet detection unit 404 transmits the sheet detection instruction to the measurement device 150a. Using FIG. 9 as an example, as indicated by 901 and 902, the time interval of the sheet detection execution instruction according to the present embodiment is set to 0.5 seconds in advance for both sheet reset detection and sheet set detection. Accordingly, the sheet detection unit 404 repeatedly transmits the sheet detection instruction to the measurement device 150a in accordance with the time interval of 0.5 seconds for the sheet detection execution instruction. Meanwhile, the parameters pertaining to the state transitions held in the HDD 104 of the control device 110 are similar to those in Table 1 in the first embodiment, and "State" is set to "CheckingOldPaperRemoved", which indicates that whether the sheet has been removed is being confirmed.

Next, in step S813, the measurement device 150a confirms whether a sheet is set in the measurement device. A sensor that detects sheets is provided in the measurement device 150a, and whether a sheet is set in the measurement device is confirmed using the sensor. In step S814, the measurement device 150a transmits the detection result from step S813 to the control device 110. Using FIG. 9 as an example, the consecutive sheet detection number for sheet reset detection is set to one in advance. Accordingly, when the detection result in step S813 is "sheet absent", the control device 110 increments a sheet absent counter number, and the sheet absent counter number reaches the consecutive sheet detection number of 1. In other words, the consecutive sheet detection number is set to one in advance, and thus the control device 110 determines that the sheet has been removed from the measurement device upon a single sheet absent detection. The control device 110 then sets "isOldPaperRemoved" held in the HDD 104 to "True". Additionally, by setting "isNextPage" to "True", the control device 110 causes the LED of the measurement device 150a to light up in blue, which notifies the user that a sheet can be set.

Figure 5B:
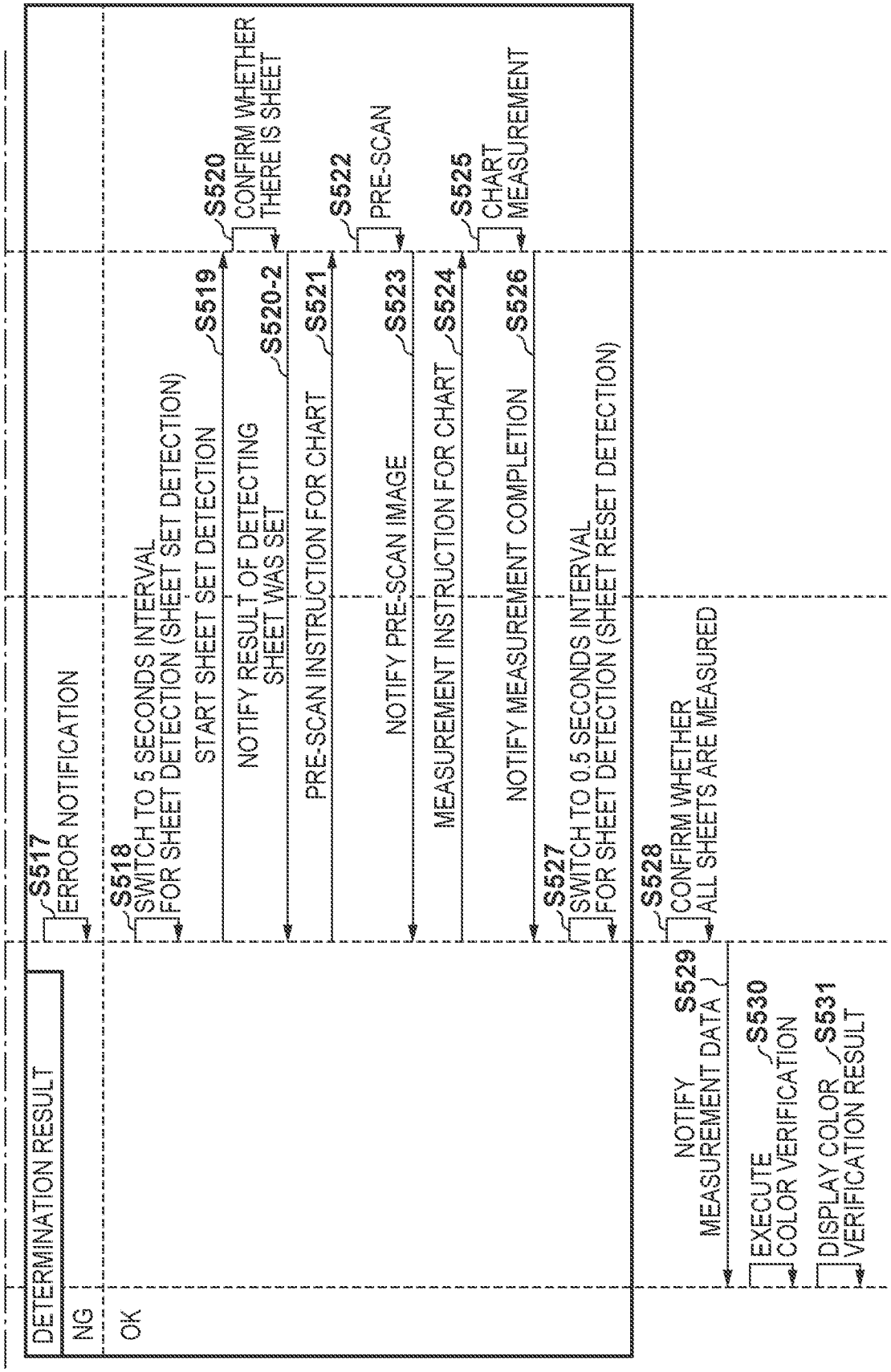
FIG. 5B is a sequence chart illustrating the flow of processing in the color verification system according to one embodiment.

The processing from the selection of the measurement start button in step S815 to the error notification in step S817 is similar to that described in the first embodiment in steps S515 to S517 of the sequence charts in FIGS. 5A and 5B, and will therefore not be described here. If, in step S816, the sheet detection unit 404 has determined that "isOldPaperRemoved" is "True", indicating that the sheet has been removed, in step S818, the consecutive sheet detection number is switched to a number for sheet set detection. To use FIG. 9 as an example, the consecutive number for sheet set detection is set to five in advance as indicated by 902, and thus the sheet detection unit 404 sets the consecutive sheet detection number to five. In other words, when the time interval of the sheet detection execution instruction is 0.5 seconds and the consecutive sheet detection number is 5, and a sheet present detection is therefore determined, the pull-in of the chart is started at least 0.5 (seconds)×5 (times)=2.5 seconds after the user has placed the chart in the measurement device 150a. In FIG. 9, the first detection instruction after the user has set the chart is issued as indicated by 911, and the chart is detected. Then, as indicated by 912 to 915, a detection instruction is issued every 0.5 seconds, and when the chart is detected, the pull-in of the chart is started. Accordingly, after the user has placed the chart in the measurement device 150a, the user can be given some time to release their hand from the chart.

In step S819, the sheet detection unit 404 transmits the sheet detection instruction to the measurement device 150a. Using FIG. 9 as an example, as indicated by 901 and 902, the time interval of the sheet detection execution instruction is set to 0.5 seconds in advance for both sheet reset detection and sheet set detection, similar to step S812. Accordingly, the sheet detection unit 404 repeatedly transmits the sheet detection instruction to the measurement device 150a in accordance with the time interval of 0.5 seconds for the sheet detection execution instruction. Next, in step S820, the measurement device 150a detects whether a sheet is set in the measurement device 150a, in the same manner as in step S813. If the detection result indicates a sheet is absent, in step S820-2, the control device 110 is notified of "sheet absent", and the UI control unit 402 of the control device 110 performs processing for prompting the user to measure the color of the printed-out chart from the target printer. Specifically, a guidance screen such as that illustrated in FIG. 6J is displayed, and the user is prompted to set the printed-out chart in the measurement device.

On the other hand, using FIG. 9 as an example, the consecutive sheet detection number for sheet set detection is set to five in advance. Accordingly, when the detection result indicates a sheet is present, the control device 110 increments a sheet present count number. Thereafter, too, the sheet detection instruction in step S819 is repeated, the detection result is repeatedly transmitted from the measurement device 150a to the control device 110, and if the detection result indicates "sheet present", the sheet present count number is incremented each time. The measurement device 150a then notifies the control device 110 of "sheet present" when the sheet present count number reaches the consecutive sheet detection number of five. Note that the notification of "sheet present" made from the measurement device 150a to the control device may be made when the consecutive sheet detection number has reached the set number of times (here, five), or may be made each time "sheet present" is detected. The control device 110 may count the number of times when the notification is made each time "sheet present" is detected.

The processing from the chart pre-scan instruction in step S821 to the measurement completion notification in step S826 is similar to that described in the first embodiment in steps S521 to S526 of the sequence chart in FIG. 5B, and will therefore not be described here. In step S827, the sheet detection unit 404 switches the consecutive sheet detection number to the number for sheet reset detection. To use FIG. 9 as an example, the consecutive number for sheet reset detection is set to one in advance as indicated by 901, and thus the consecutive sheet detection number is set to one. Additionally, the control device 110 sets "isOldPaperRemoved" held in the HDD 104 to "False", indicating that the sheet has not been removed. The control device 110 also sets "isNextPage" to "False", which causes the LED of the measurement device to be lit up in red, and the user is notified that the sheet still remains after being discharged. The processing from confirming the number of sheets measured in step S828 to displaying the color verification result in step S831 is similar to that described in the first embodiment in steps S528 to S531 of the sequence chart in FIG. 5B, and will therefore not be described here.

The foregoing has described the flow of the overall processing performed by the color verification system according to the present embodiment. The present embodiment describes an example in which the time interval of the sheet detection execution instruction is set to the same for both sheet present detection and sheet absent detection, the consecutive sheet detection number during sheet present detection is set to 5, and the consecutive sheet detection number during sheet absent detection is set to one, as indicated in Table 3. Accordingly, setting the consecutive number for sheet present detection to be greater than the consecutive number for sheet absent detection secures time for the user to set the sheet in the measurement device, and the sheet can be set with some flexibility, which makes it possible to prevent measurement defects caused by wrinkles in the sheet, folded corners, and the like. On the other hand, setting the consecutive number for sheet absent detection to a low number enables quick detection and control from the start of the sheet absent detection in step S812 to the result of the sheet absent detection in step S814. This makes it possible to quickly transition to the measurement standby state (the LED of the measurement device lighting up in blue) when the user removes the sheet, which in turn makes it possible to improve the convenience for the user. Additionally, as indicated in Table 3, the consecutive sheet detection number during sheet present detection may be set to three to ten, and the consecutive sheet detection number during sheet absent detection may be set to one to two, as a variation.

TABLE 3

| | Sheet present detection | Sheet absent detection | Description |
| --- | --- | --- | --- |
| Second Embodiment | 5 times | 1 time | Sheet present detection number > sheet absent detection number |
| Second Variation | 3 to 10 times | 1 to 2 times | Same as above |

According to the present embodiment, when color patches arranged in a chart printed out from a printer are to be measured, the time intervals of the sheet detection execution instruction are set to the same intervals for sheet absent detection and sheet present detection, and with respect to the consecutive sheet detection number, the sheet absent detection and the sheet present detection are controlled under different conditions. As a result, even when a sheet has been set at the end of the time interval of the sheet detection execution instruction, it is possible to both prevent measurement defects caused by wrinkles, folded corners, and the like when feeding a sheet, and improve the convenience for the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-073678, filed Apr. 27, 2022, which is hereby incorporated by reference herein in its entirety.

What is claimed is:

1. An information processing apparatus comprising:
    a memory that stores instructions; and
    a processor that executes the stored instructions to function as:
        a detection unit that detects that a sheet to be fed is placed in a measurement device or a fed sheet is discharged from the measurement device;
        a measurement unit that, in a case where a sheet is detected as being placed, measures a chromaticity value of a patch formed on the sheet, using the measurement device; and
        a control unit that sets, to the measurement device, a first detection condition for detecting, in a first cycle, that a sheet to be fed is placed in the measurement device and a second detection condition for detecting, in a second cycle, that a fed sheet is discharged from the measurement device to mutually different detection intervals,
    wherein the first cycle is longer than the second cycle, and
    wherein in a case where the first condition set by the control unit is satisfied, the detection unit determines that the sheet to be fed is placed in the measurement device, and in a case where the second condition set by the control unit is satisfied, the detection unit determines that the fed sheet is discharged from the measurement device.

2. The information processing apparatus according to claim 1,
    wherein the control unit provides a standby time after the detection unit detects that a sheet to be fed is placed in the measurement device according to the first detection condition.

3. The information processing apparatus according to claim 1,
    wherein the control unit sets the first cycle of the first detection condition to at least two and at most ten seconds, and sets the second cycle of the second detection condition to less than two seconds.

4. The information processing apparatus according to claim 1,
    wherein the first detection condition and the second detection condition are a number of times a sheet placed in the measurement device is detected, the control unit sets the first detection condition to a number of times greater than the second detection condition, and
    in a case where the condition set by the control unit is satisfied, the detection unit determines that a sheet to be fed is placed in the measurement device.

5. The information processing apparatus according to claim 4,
    wherein the control unit sets the number of times of the first detection condition to no less than three and no more than ten, and sets the number of times of the second detection condition to no less than one and no more than two.

6. The information processing apparatus according to claim 1,
    wherein in a case where the first detection condition is satisfied, the measurement device starts pulling the sheet placed in the measurement device into the measurement device.

7. The information processing apparatus according to claim 1,
    wherein the processor further executes the stored instructions to function as a setting unit that sets whether the detection unit is to detect that a sheet to be fed is placed in the measurement device in accordance with a start instruction from a user, or whether the detection unit is to detect that a sheet to be fed is placed in the measurement device automatically.

8. The information processing apparatus according to claim 1,
    wherein the control unit communicates whether a sheet to be fed is placed in the measurement device by lighting an LED provided in the measurement device.

9. The information processing apparatus according to claim 1,
    wherein the processor further executes the stored instructions to function as a unit that, using a measurement result from the measurement unit, executes color verification of a printing device that has formed the patch on the sheet.

10. The information processing apparatus according to claim 1,
    wherein the information processing apparatus is a control device connected, over a network, to a color verification device that performs color verification, and
    the control unit transmits a measurement result by the measurement unit to the color verification device, and causes the color verification device to perform color verification of a printing device that has formed the patch on the sheet.

11. A control method for an information processing apparatus, the method comprising:
    detecting that a sheet to be fed is placed in a measurement device or a fed sheet is discharged from the measurement device;
    in a case where a sheet is detected as being placed, measuring a chromaticity value of a patch formed on the sheet, using the measurement device; and
    setting, to the measurement device, a first detection condition for detecting, in a first cycle, that a sheet to be fed is placed in the measurement device and a second detection condition for detecting, in a second cycle, that a fed sheet is discharged from the measurement device to mutually different detection intervals,
    wherein the first cycle is longer than the second cycle, and
    wherein in a case where the first condition set by the control unit is satisfied, the detection unit determines that the sheet to be fed is placed in the measurement device, and in a case where the second condition set by the control unit is satisfied, the detection unit determines that the fed sheet is discharged from the measurement device.

12. A non-transitory computer-readable storage medium storing a computer program for causing a computer to execute each step of a control method for an information processing apparatus, the method comprising:
  detecting that a sheet to be fed is placed in a measurement device or a fed sheet is discharged from the measurement device;
  in a case where a sheet is detected as being placed, measuring a chromaticity value of a patch formed on the sheet, using the measurement device; and
  setting, to the measurement device, a first detection condition for detecting, in a first cycle, that a sheet to be fed is placed in the measurement device and a second detection condition for detecting, in a second cycle, that a fed sheet is discharged from the measurement device to mutually different detection intervals,
  wherein the first cycle is longer than the second cycle, and
  wherein in a case where the first condition set by the control unit is satisfied, the detection unit determines that the sheet to be fed is placed in the measurement device, and in a case where the second condition set by the control unit is satisfied, the detection unit determines that the fed sheet is discharged from the measurement device.

* * * * *